(12) United States Patent
Rees

(10) Patent No.: US 7,421,125 B1
(45) Date of Patent: Sep. 2, 2008

(54) IMAGE ANALYSIS, EDITING AND SEARCH TECHNIQUES

(75) Inventor: David Baxter Trehame Rees, Palo Alto, CA (US)

(73) Assignee: Altor Systems Inc., Palo Alto, CA (US)

( * ) Notice: Subject to any disclaimer, the term of this patent is extended or adjusted under 35 U.S.C. 154(b) by 795 days.

(21) Appl. No.: 11/075,260

(22) Filed: Mar. 8, 2005

Related U.S. Application Data

(60) Provisional application No. 60/552,518, filed on Mar. 10, 2004.

(51) Int. Cl.
*G06K 9/00* (2006.01)

(52) U.S. Cl. ............... 382/181; 382/190; 382/282; 382/278

(58) Field of Classification Search ............ 382/190, 382/219, 278, 282
See application file for complete search history.

(56) References Cited

U.S. PATENT DOCUMENTS

| | | | |
|---|---|---|---|
| 5,642,443 A | | 6/1997 | Goodwin et al. |
| 5,775,125 A | * | 7/1998 | Sakai et al. .................. 62/410 |
| 5,781,225 A | * | 7/1998 | Syracuse et al. ............ 347/258 |
| 5,909,251 A | * | 6/1999 | Guichard et al. ......... 348/416.1 |
| 6,181,818 B1 | | 1/2001 | Sato et al. |
| 6,452,637 B1 | * | 9/2002 | Rudin et al. ............. 348/416.1 |
| 6,548,312 B1 | * | 4/2003 | Hayano et al. ................. 438/5 |
| 6,584,221 B1 | | 6/2003 | Moghaddam et al. |
| 2003/0053686 A1 | | 3/2003 | Luo |
| 2003/0179213 A1 | | 9/2003 | Liu et al. |

OTHER PUBLICATIONS

Adalsteinsson D, Sethian J A: A Fast Level Set Method for Propagating Interfaces, J. Comp. Physics, 118, pp. 269-277, 1995.
Carson C, Ogle V E:Storage and Retrieval of Feature Data for a Very Large Online Image Collection.IEEE Data Eng. Bull. 19(4): 19-27 (1996).
Carson C, Belongie S, Greenspan H, Malik J:Blobworld—Image segmentation using expectation maximization and its application to image querying,IEEE Trans. Pattern Anal. and Machine Intell.24(8), pp. 1026-1038, 2002.
Chen Y,Wang J Z: "A region-based fuzzy feature matching approach to content-based image retrieval", IEEE Trans. Pattern Anal. and Machine Intell. 24(9), pp. 1252-1267, 2002.

(Continued)

*Primary Examiner*—Yosef Kassa

(57) ABSTRACT

Disclosed is a method for characterizing the content of a digital image. A component of the method is the homogeneity measure, which calculates a value or values based on the local similarity of portions of a sample area. A further component is a means of optimally adjusting the shape and offset of the local sample area to improve the resulting measure. The homogeneity measure may be applied at a higher level to segment an image, by grouping together larger portions of an image whose sub-components are locally similar. A strongly homogeneous region is a contiguous region composed of elements exhibiting local homogeneity better than that of surrounding elements, and may be applied to identify the scale and other characteristics of a portion of an image. This may be used to facilitate algorithms that separate lighting and texturing information, and in identifying the composition of an image.

25 Claims, 11 Drawing Sheets

OTHER PUBLICATIONS

Cohen J, Tchou C, Hawkins T, Debevec P E:Real-Time High Dynamic Range Texture Mapping, Proceedings of the 12th Eurographics Workshop on Rendering Techniques, 313-320, 2001.

Debevec P E, Taylor C J, Malik J : Modeling and Rendering Architecture from Photographs, In ACM SIGGRAPH '96 Proceedings, pp. 11-20, Aug. 1996.

Foley J, Van Dam A, Feiner S, Hughes J: "Computer Graphics: Principles and Practice, Second Edition", Addison Wesley Publishing Company Inc.,1990.

Hertzmann A, Jacobs C E, Oliver N, Curless B, Salesin D H : Image Analogies, ACM SIGGRAPH '96 Proceedings, pp. 327-340, Aug. 2001.

Liebowitz D, Criminisi A, Zisserman A: Creating architectural models from images, in Proc. Euro- Graphics, vol. 18, pp. 39-50, Sep. 1999.

Lin C, Nevatia R: 3-D Descriptions of Building from an Oblique View Aerial Image, IEEE International Symposium on Computer Vision, 1995, pp. 377-382. 1995.

Malik J, Belognie S, Leung T, Shi J: Contour and texture analysis for image segmentation. International Journal of Computer Vision, 43(1):pp. 7-27, 2001.

Meer P, Georgescu B: Edge Detection with Embedded Confidence, IEEE Trans. Pattern Anal. and Machine Intell. 23(12), pp. 1351-1365, Dec. 2001.

Niblack W, Barber R, Equitz W, Flickner M, Glasman E, Petkovic D, Yanker P, Faloutsos C: "The QBIC Project: Querying Images by Content Using Color, Texture, and Shape", IBM Research Report, RJ 9203, Feb. 1, 1993.

Oh B M, Chen M, Dorsey J, Durand F: Image-Based Modeling and Photo Editing, ACM SIGGRAPH 2001 Proceedings, pp. 433-442, Aug. 2001.

Pentland A, Picard R, and Sclaroff S: "Photobook: Tools for Content-Based Manipulation of Image Databases", SPIE Paper 2185-05 Storage and Retrieval of Image and Video Databases II, San Jose, CA. Feb. 6-10, 1994.

Strum P F, Maybank S J: A method for ineractive 3d reconstruction of piecewise planar objects from single views.In In Proc. BMVC, pp. 265-274, 1999.

Ylä-Jääski A, Ade F: Grouping Symmetrical Structures for Object Segmentation and Description, Computer Vision and Image Understanding vol. 63, No. 3, pp. 399-417, May 1996.

Wang J Z, Li J, Wiederhold G: "SIMPLIcity: Semantics-Sensitive Integrated Matching for Picture LIbraries", IEEE Trans. Pattern Anal. and Machine Intell. 23(9), pp. 947-963, 2001.

\* cited by examiner

IMAGE ANALYSIS, EDITING AND SEARCH TECHNIQUES

CROSS-REFERENCE TO RELATED APPLICATION

This application claims the benefit of U.S. Provisional Application No. 60/552,518, entitled "Image analysis, editing and search techniques", filed Mar. 10, 2004.

FEDERALLY SPONSORED RESEARCH

Not Applicable

SEQUENCE LISTING OR PROGRAM

Not Applicable

| | | |
|---|---|---|
| 20030053686 | March 2003 | Jeibo, Luo & Amit, Singhal |
| 20030179213 | September 2003 | Lui |
| 6,584,221 | June 2003 | Moghaddam et al. |
| 6,181,818 | January 2001 | Sato et al. |
| 5,642,443 | June 1997 | Goodwin |

OTHER REFERENCES

1. Adalsteinsson, D., and Sethian, J. A., A Fast Level Set Method for Propagating Interfaces, J. Comp. Physics, 269-277, 1995.
2. Carson C, Ogle V. E.: Storage and Retrieval of Feature Data for a Very Large Online Image Collection. IEEE Data Eng. Bull. 19(4): 19-27 (1996)
3. Carson C, Belongie S, Greenspan H, Malik J: Blobworld—Image segmentation using expectationmaximization and its application to image querying. IEEE Transactions on Pattern Analysis and Machine Intelligence 24(8): 1026-1038, 2002.
4. Chen Y, Wang J Z: "A region-based fuzzy feature matching approach to content-based image retrieval," IEEE Transactions on Pattern Analysis and Machine Intelligence, pp. 1252-1267, 2002.
5. Jonathan Cohen, Chris Tchou, Tim Hawkins, and Paul E. Debevec. Real-Time High Dynamic Range Texture Mapping, Proceedings of the 12th Eurographics Workshop on Rendering Techniques, 313-320, 2001
6. Debevec, Paul E. and Taylor, Camillo J., and Malik, Jitendra. Modeling and Rendering Architecture from Photographs. In SIGGRAPH '96, August 1996.
7. Foley, James and van Dam, Andies, and Feiner, Steven, and Hughes, John, "Computer Graphics: Principles and Practice, Second Edition", Addison Wesley Publishing Company Inc., 1990.
8. Hertzmann A., Jacobs C. E., Oliver N., Curless B., Salesin D. H., Image Analogies. 327-340, SIGGRAPH '96, August 2001
9. D. Liebowitz, A. Criminisi, and A. Zisserman, "Creating architectural models from images," in Proc. Euro-Graphics, vol. 18, pp. 39-50, September 1999.
10. Lin C., and Nevatia R., 3-D Descriptions of Building from an Oblique View Aerial Image, IEEE International Symposium on Computer Vision, 1995, pp 377-382.
11. J. Malik, S. Belognie, T. Leung, and J. Shi. Contour and texture analysis for image segmentation. International Journal of Computer Vision, 43(1): 7-27, 2001.
12. P. Meer and B. Georgescu, Edge Detection with Embedded Confidence, IEEE Transactions On Pattern Analysis And Machine Intelligence, 23, NO. 12, December 2001.
13. W. Niblack, R. Barber, W. Equitz, M. Flickner, E. Glasman, Dragutin Petkovic, Peter Yanker, Christos Faloutsos, "The QBIC Project: Querying Images by Content Using Color, Texture, and Shape", IBM Research Report, RJ 9203, Feb. 1, 1993.
14. B. M. Oh, M. Chen, J. Dorsey, and F. Durand., Image-Based Modeling and Photo Editing. In ACM SIGGRAPH 2001 Conference Proceedings, 433-442, August 2001.
15. Pentland A., Picard R., and Sclaroff S., "Photobook: Tools for Content-Based Manipulation of Image Databases." SPIE PAPER 2185-05 Storage and Retrieval of Image and Video Databases II, San Jose, Calif. Feb. 6-10, 1994.
16. P. F. Strum and S. J. Maybank. A method for ineractive 3d reconstruction of piecewise planar objects from single views. In In Proc. BMVC, pages 265-274, 1999.
17. Ylä-Jääski A., Ade F., Grouping Symmetrical Structures for Object Segmentation and Description, Computer Vision and Image Understanding Vol. 63, No. 3, May 1996, pp. 399-417
18. J. Z. Wang, J. Li, and G. Wiederhold, SIMPLIcity: Semantics-Sensitive Integrated Matching for Picture LIbraries," IEEE Trans. Pattern Anal. and Machine Intell., vol. 23, no. 9, pp. 947-963, 2001.

BACKGROUND OF THE INVENTION

Field of the Invention

The present invention relates generally to digital image processing systems, and more specifically to a process to edit, detect, categorize, and automatically search images and sub components of images, to search databases for entire digital image content and content of specific regions within digital images, and to extract additional information such as three dimensional shape.

SUMMARY OF THE INVENTION

Within the field, objectives of the invention include allowing and improving identification of distinct regions within a digital image. Another objective of the invention is to facilitate usage of resulting regions to make possible and improve comparison and search activities with the content of entire images or segments within images. A further objective of the present invention is to aid and improve complex image editing actions. This may be achieved by use of an image-processing algorithm with several novel features, and novel uses of the results.

The invention analyses an overall area adjacent to and possibly including a candidate pixel. One novel feature is that this overall area is split into several independent sets of sub-areas, each of which are analyzed. In the preferred embodiment, the sub areas consist of sets of pairs, where the division between the two sub-areas of each pair splits the overall area in two. It is preferred that the direction of the divisions should be oriented as differently as possible between each of the pairs. The results for each of the sub areas for each pair are compared for similarity, and the similarity measures resulting from all of the sets are aggregated. The resulting novel measure represents the homogeneity of the overall area, as it is aggregating the similarity of many pairs of sub areas at many orientations.

Another novel feature of the invention is that multiple shapes of the overall area may be used. The measures from all these shapes are compared, and the best one is retained as long as the pixel sample sizes for all of them are comparable. The shape information may be used to give an indication of a characteristic of the image. A further novel feature is that the shape may be asymmetric. Some desirable image segments may be long and narrow, such as a light stand or tree trunk. A vertically long and horizontally thin overall shape is likely to give a stronger homogeneity measure in such circumstances, as symmetric or short and horizontal wide overall shapes will overlap into other image regions and give poor results.

A further novel aspect to the invention is that the shape of the overall area need not be centered on the candidate position or pixel. Consider the edge of a region. Centered areas will tend to blur the borders of such regions, as they will overlap into neighboring regions and return poor homogeneity. Asymmetric shapes will help, as they can be aligned with the border, but an extremely narrow area may be impractical, as the image measures applied may require filters of a given width. In this case, the invention can also test overall areas that are not centered on the candidate position or pixel. In accordance with an advantageous feature of the present invention, the above process allows the measure to be applied closer to the edge of an image region, resulting in improved definition of the resulting boundaries and better characterization of small regions.

Local calculations may optionally involve a single pixel or aggregate of pixels in proximity to and including the candidate pixel. This permits the techniques detailed below to measure a highly localized value as well as a wider filters. The term basis pixel is introduced to describe a set of one or more bitmap pixels including and in close proximity to the candidate pixel. A concern in the application of the overall sample area offset is that most of the overall area may lie in a neighbor region, and the position may be incorrectly classified. To counter this, another aspect of the present invention is introduced. The measures applied in the sub areas detailed above are also applied to the overall area, but excluding the basis pixel. As a result, the basis pixel can be tested for membership of the overall area. In the middle of a region, this will have little or no effect on the homogeneity measure outcome. At border regions, this will weight in favor of an overall area that is both close to the border but that also encompasses similar measure characteristics to that of the candidate position. This creates sharper borders and improved segmentation. It also minimizes the possibility that a candidate will be incorrectly classified as belonging to a neighboring region.

This homogeneity measure is then applied to sample areas associated with all the desired basis pixels with an image. This can be computationally expensive, so a further advantageous feature of the invention is that the result may be progressively refined if desired. A limited set of overall areas and offsets can be initially applied to all the pixels. In portions of the image where good results are detected, no further action need take place. In areas where poor results occur, especially those near good results, more shapes and offsets can be applied to improve the result. An additional option is that the shapes and offsets may be chosen in context. If the poor area is adjacent to large areas of good results, the distance to the good results and the rough shape of the good results area may influence the shapes and offsets. If the good area is close, small offsets may be utilized first, and the rough shape of the good area can be matched against the overall sample area repertoire available. Using these methods, computational time may be substantially reduced, and initial results may be available far sooner, with improved results generated later.

In one aspect, the process may also be applied in a novel fashion, in that incomplete segmentation may be desirable. The homogeneity measure may be used to indicate contiguous regions with a good result that do not include less certain border cases. These can act as a representative portion of the image region, where the area is used for analysis to characterize the region. As the representative area has a strong homogeneous measure, it is much less likely to be cluttered with extraneous data, or erroneously overlap another actual image region, and hence resulting measures will be an improved characterization. This may in turn provide more distinct information about the segment, allowing improved segment boundary detection, and improved searching capabilities for matching a region or several regions or an entire image against other images and regions of images, in applications including context based image retrieval (CBIR).

One common use of image texture is as a means of drawing shapes or combinations of regions and patterns that may not be present in a bitmap. This is useful in applications such as photo retouching, replacing a fabric on a desired object in an image, or providing surface characteristics to three-dimensional models. Existing methods require manual identification of the characteristics of the replacement image texture. In possible embodiments, by use of strongly homogeneous regions, the invention can automate this process, as the segment can be automatically characterized in a similar manner as that used for CBIR. The segment need only be identified, and then its characteristics can then be applied for drawing, for example by shading, scaling or orienting a replacement material consistent with the original surface.

In another aspect, the invention provides a method of automatically identifying the optimal scale of the segment. The algorithm may apply the analysis detailed above at multiple scales, and may produce strong homogeneity regions at several scales. By using a combination of the homogeneity strength within a contiguous image area and the size of that area the invention can automatically determine from multiple potentially competing results that which is the best scale to use. This can promote a large complex segment over more local but well-defined segments. Given that the scale of detection and the size and other characteristics of the sample areas used are known, the pixel dimensions of the segment characteristic texture can be automatically determined.

In some embodiments, an important task for image analysis is to discern the surface texture from the illumination of the surface. Improved lighting detection is possible with the present invention, as the process outlined above automatically identifies a best scale of representation of the texture. This can then be used as input to filtering algorithms that decouple low frequency lighting effects from high frequency texture effects.

In another aspect of the present invention, boundaries of segments may be further improved by the integration of multiple scales. When a dominant homogeneous region is found over a wide area at a coarse scale, finer scale identified regions may overlap it. If they do so close to the border, the fine scale edges may be used to provide a more defined edge to the coarse scale region. This is possible, as fine scale segments will have been detected using overall sample areas that take up a smaller proportion of the image space. Hence, filtering artifacts will occur in a much narrower band around a segment border.

In some embodiments, the spatial relationships of strongly homogeneous regions detected above can also be used to characterize image composition in an automated fashion. Without prior assumptions as to image content, the regions may indicate dominant areas within the image, which can be inferred as a subject area. Other regions, or portions of the image can be treated as unimportant. The spatial layout and content of the subject regions may be applied to categorize an image, and possibly to determine the orientation at which the image was captured.

A further aspect of the invention is that a means of image content shape and orientation detection are made possible. When overlapping homogeneous regions are discovered, where the scales of detection are very similar, and region image measures are also similar, it may be inferred that these regions actually represent a single image segment where the scale is changing. The amount of overlap and the layout of the regions can be used to infer an approximate three dimensional orientation of the surface represented in the image. In a simple example, a set of successive overlaps in a roughly linear path, where the scale is changing exponentially with image distance can be used to infer a perspective effect. The rate of change can then be used to estimate foreshortening, and hence the angular component of the surface normal to the image plane. The direction of change can be used to determine the angle of the surface parallel to the image plane. A horizontal change implies a surface oriented vertically in the image, and vice-versa.

In some embodiments, other segmentation algorithms may be applied to the data, and a feature of the present invention is as a basis for such algorithms. Some existing segmentation algorithms require training sets, image compositional assumptions, or estimates of the number of distinct texture classes present. The strongly homogeneous region measures can be applied both as a spatial seed for region growth, and as a set of distinct classes, structure and type of phenomena present. This information may be used to initialize such algorithms. As an example, the k-means clustering algorithm requires that the value k must be estimated in advance. Identification of the number of strongly homogenous regions can be used as a starting point for estimating k automatically.

These processes, individually or combined, provide a means by which users can more easily perform desirable operations with and upon image data. They can make complex operations simpler for the user due to improved analysis of image information.

Other and further objectives of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BACKGROUND OF THE INVENTION

The methods in this invention stem from five principle backgrounds. Image segmentation is the action of algorithmic or user controlled identification of a region or regions of one or more images. Image structuring involves automatically or semi-automatically recognizing and structuring the contents of an image. Computer Aided Design (CAD), Computer Aided Manufacture (CAM) is a process by which tools are used to design and construct 2 D and 3 D environments. Context Based Image Retrieval (CBIR) uses image measures including segmentation to classify and retrieve image data. Finally, lighting removal is a means by which the effects of light and shadow can be detected and removed from an image.

Image Segmentation

Image segmentation algorithms have the goal of partitioning an image into regions that are usually non-overlapping. At their most basic, they fall into primary categories of thresholding/clustering, edge detection and area-growth based segmentation, or some combination thereof. Clustering and thresholding involve taking measures of the whole image, and seeking some form of grouping of these measures, and then applying that to group the image itself. Edges are roughly continuous thin portions of an image that exhibit some peak discrepancy between image pixels on either side of the boundary. Area based segmentation involves applying criteria to groups of pixels, that if satisfied result in them being classified as part of an area. Adobe Photoshop appears to use area growth as a means for selecting complex regions in an image using the magic wand brush.

The advantage of clustering and thresholding is that the entire image acts as a sample. If the sample is large, new information can be discerned. This is also its disadvantage, in that it fails to take into account the spatial information of an image. In addition, clustering algorithms such as k-means require as input an expected number of means, whereas images may have a varying number of actual distinct groupings of data. Boundary and edge detection excels at finding region borders, but can be overwhelmed by noise or heavily textured areas. Finally, region growth can overcome noise, but it may be difficult to determine when to terminate growth, and as the measure is area based, the sample size can blur sharp boundaries.

More recent techniques have concentrated on combinations of these approaches. Malik (2001) introduces the scheme of graph cuts to partition the space of a large number of filter results, in combination with an area-based measure for detecting boundaries. This still requires an input guess for the k-means algorithm, where for this algorithm k=25 is recommended.

Another approach to segmentation is to limit the set of initial conditions. U.S. Pat. No. 5,642,443 to Goodwin uses color and (lack of) texture to indicate pixels associated with sky in the image. In particular, Goodwin utilizes partitioning by chromaticity domain into sectors. Pixels with sampling zones along the two long sides of a non-oriented image are examined. If an asymmetric distribution of sky colors is found, the orientation of the image is estimated. This may work well in specific instances, but sky regions tend to be easily identifiable in contrast with ground. The field of our invention is the identification of more complex regions, so this approach is inappropriate.

US Published Patent 20030053686 to Jeibo details a system whereby red green blue pixels within an image are assigned belief values per pixel rating their belonging to subject matter based on color and texture. These values are then thresholded to find candidate regions, and the regions further analyzed using unique attributes of each region to generate a resulting map of regions. This allows usage of the global measures similar to those applied in Malik (2001), with the addition of a local pass. To be effective, the color and texture must be known or a wide range calculated. The goal of the paper is detection of sky data, and hence the range of measures may be limited. In addition, a classifier is still required to partition the various measures into classes. 20030053686 to Jeibo proposes a neural network, which is trained on a series of sky images. Detection of regions in general images would require a significant amount of training, so this method appears best suited to specific, well known and highly defined tasks.

Computer Aided Design

Within the domain of 3 D CAD/CAM (Computer Aided Design, Computer Aided Manufacture), a 2 D or 3 D space containing data representations is presented to the user, with the objective of fashioning more 2 D or 3 D data in accordance with a set of user commands. The data is normally entered by the user, or derived from image data. In many current embodiments, the derivation of the data from an image is a separate process from that of altering and interacting with the data. For example, RealViz Image Modeller may be used to identify objects and geometry within an image. However, the objects and geometry are then exported to an application such as Alias Systems Maya for manipulation.

Shape Recognition and Extraction

The process of recovering three-dimensional structure from two-dimensional images is an ongoing field of research in Photogrammetry and Computer Vision. No general-purpose techniques exist to completely accomplish this task, but there are many specific techniques for doing so. One means of classifying such techniques is into two major categories, namely those that provide results either with or without user assistance. For the purpose of this disclosure, applications requiring user assistance will be the focus of the background material as they contribute to the field of the invention.

A large body of work exists toward automatic extraction and recognition of shapes, objects, and groups from images. The primary goal of such work is toward computer vision, where an autonomous agent may recognize and manipulate a location through automated conversion of images into object models.

An early approach to manual extraction of objects is detailed within (Lin and Nevatia 1995). They describe a process whereby multiple objects are extracted from a single oblique image. A hierarchical perceptual grouping process is used to generate 2-D roof hypotheses from fragmented linear features of the input image, which are then verified. A 3 D description of the building may then be derived. This is helpful for identifying simple planar objects, but they do not detail an application to more complex shapes.

Ylä-Jääski and Ade (1996) detail a methodology for shape recognition for industrial robotics using either monocular or multiple images. Edge information is determined within an image. The edges are grouped by use of symmetry into linear segment pairs (LSP). Multiple LSP are grouped to make more complex shapes that are considered to be objects, which may then be compared with a known object database. For example, the tines on a fork are recognized as multiple parallel structures that are grouped together, and then matched against descriptions of forks. This method works under idealized conditions, where the object is easily extracted from a background, but would be far more difficult to apply in arbitrary environments.

Debevec et al (1996) describe an approach for extracting three-dimensional shape from multiple images by a human operator. The user applies geometric primitive operations to views of the objects, fitting shapes such as edges and cubes to remain consistent between multiple views. This is easily applicable to simple geometric objects, where many of the constituent planes are easily identified and are oriented at common angles—for example 90 degrees. It is difficult to apply in the presence of more complex and soft objects, such as trees or pillows, and also requires multiple images.

Liebowitz et al (1999) details the construction of objects from single or multiple images. A perspective function is identified for the image using detected vanishing points and lines, and then objects within it may be identified. This is similar to Debevec et al (1996), but works for single images. In addition, images can be improved upon. In the example of La Flagellazione di Cristo, the floor is touched up by use of the symmetrical pattern upon it, and the ceiling is reconstructed from a partially visible segment. As with Debevec et al (1996), it is difficult to apply in the presence of more complex and soft objects Oh (2001) details an approach to manually extracting the three dimensional shape from images. Their paper claims a time saving over existing techniques and applicability to single images, primarily by using an imaging editing or painting metaphor. This compares with Debevec et al (1996), where multiple images are a requirement, and geometric extraction is paramount. However, the approach detailed in Oh (2001) is still very intensive, requiring a large number of user-applied operations to extract shape outlines and apply depth in their example. The church example required 10 hours of labor.

A similar technique is introduced in Strum and Maybank (1999) whereby interactive 3 D reconstruction from a single image is achieved via piecewise planar objects. Camera calibration and 3 D reconstruction are done using geometrical constraints provided by the user. The user identifies points within an image that are co-planar. Line segments are used to outline segments of the image, which are mapped to 3 D planes. Finally, VRML 3 D objects are automatically generated from the segments, and textured using the image segment bitmap data.

Decoupling Illumination From Texture

Editing of images is often complicated by the illumination of the content. Consider attempting to replace an existing material in an image with a new material, or placing a new object in the image. The application Growlt Gold Garden & Landscape 2, by Innovative Thinking Software, is a classic example of the issue. Plants may be placed on top of a photographic image of an existing landscape. However, it is obvious in example images that the plants belong in a different photograph, as their brightness and the direction of illumination differs markedly from that of the base image.

Oh (2001) details an approach to dealing with the replacement of materials. They make the assumption that large-scale luminance variations are due to the lighting, while small-scale details are due to the texture. They use a Gaussian filter to separate the illumination component from the surface texture. They do require that the user manually identify the feature scale, orientation and perspective effects of each surface. This can take significant time. They do not claim that these are the true texture and illuminance, instead providing a way of factoring low frequency variations. Fine shadows are not preserved.

Content Based Image Retrieval

In the field of Content Based Image Retrieval (CBIR), a variety of approaches have been detailed to specify and extract information from images such that useful information is more easily accessible from a large amount of image data. Content comparison is an important issue in CBIR. In general, such comparisons are performed either globally using measures applied to the entire image or locally based on the structure or composition of regions/objects gained from image segmentation. A large body of work exists, and due to limited space we review those works most related to our own. Region based search is covered in greater depth, as it more directly relates to the utilization of the region segmentation process we propose.

One example of a global technique is the Photobook project Pentland et al (1994) at the M.I.T. Media Lab. Global compositional methods are applied, such as foreground extraction. Images are classified at load time as having "face", "shape", or "texture" properties, and such encoded information is searched during queries. Such a classification system is limited by the accuracy of the classifier methods applied.

The QBIC project described within Niblack (1993) uses image analysis to process queries for an image database. Color, shape, and texture measures are applied to match images in the database to a user's query. The user may specify queries by sketching shapes, or from a list of textures or a color wheel. The system then seeks content matching the users input. Selecting from a finite list introduces problems, as many desirable classes of data may not be present. A large range of options may solve this. However, this large range can overwhelm the user with sheer number of choices. The choices may be grouped for easier user access, but the user would have to be familiar with or be trained as to the classification methodology.

Carson et al (1996) describes a method that allows selection from lists of attributes such as color. The user still has to find the attributes in lists, and may either not find a good match or have to browse a huge range of options. It would be much better to point to an object or material/color in an existing image and specify that is what should be searched for.

U.S. Published Patent Application 20030179213 to Lui teaches a method for automatic retrieval of similar patterns in image databases. The method is global in approach, and is primarily aimed at video image retrieval. Color is measured through a global histogram, and feature content is measured through wavelets. The results of both are combined and weighted for a global measure. The histogram technique is illumination invariant, and the wavelet approach is robust under rotation. This approach allows a comparison of overall image similarity. Segmentation is not involved, and hence no search for a sub-part of an image matching a query is possible.

A major drawback of the global search lies in its sensitivity to intensity variations, color distortions, and cropping. In addition, we desire to find potentially local phenomena, such as matching a specific fabric in one image with similar fabrics in other images, where the pieces of the image exhibiting the desired characteristics may be small. Hence, region based search is more desirable. Some region based search approaches are described below.

Wang et al. (2001) details a system known as SIM-PLIcity (Semantics-sensitive Integrated Matching for Picture Libraries), an integrated region-based image retrieval system. It uses semantics classification based on the region representations of the image fragments. A similarity measure between image fragments is computed based on multiple region representations. It incorporates the properties of all the segmented regions so that information about a fragment can be fully used, and to overcome errors apparent in segmentation algorithms. They cite an example error or ambiguity of a dog being segmented as one region, or as legs, body, head and other regions. However, this improvement in accuracy does not solve the issue of searching for specific components of an image, and the benefit of their technique lies in avoiding these types of queries as the algorithm works best when multiple region results form the basis of a query and search. Their similarity measure is used to compare the similarity of multiple regions, rather than in identifying the regions themselves. This "soft-similarity" is more robust in the presence of individual region segmentation errors by considering multiple regions, but sacrifices the ability to use individual region or even sub-region information to specifically classify and compare images.

Chen and Wang (2002) describe a method for searching for regions to characterize an image. They use a k-means segmentation technique, which requires prior judgment of the value k or some resulting inaccuracy if a more general value of k is used. They avoid the issue of poor segmentation by applying fuzzy logic to match regions identified, and their method is aimed at that of matching entire images. Many sample regions are required to overcome the inherent inaccuracies in identifying regions, so that matching of a small portion of an image to another small portion is highly error prone. Hence, their technique is limited to entire images ideally, or significant areas of an image if greater inaccuracy is tolerated.

Software known as Blobworld is detailed within Carson et al (2002). It allows selection of specific features to match on, with segmentation utilizing k-means techniques. They modify k-means to account for photographic composition, with the assumption of a primary object or subject exhibiting a limited set of arrangements. To query an image, a user is provided with the segmented regions of the image and is required to select the regions to be matched and also attributes, e.g., color and texture, of the regions to be used for evaluating similarity. However, selection of regions does not necessarily match user expectations, especially if the segmentation is error prone. The k-means composition assumption limits the range of images this may be applied to, as they propose composition based on a simple set of pre-defined arrangements. This assumption would break if other forms of composition were applied. In the field of our invention, there may be no defined main subject or section, or arbitrary numbers of subjects may be present, as the image may be composed of a variety of furnishings or plants.

U.S. Pat. No. 6,584,221 to Moghaddam allows the identification of images in a database based on a user specified region of interest. This is achieved by division of images into blocks based on color and texture, and then use of the combined distributions of each of those blocks as a means of comparison. Segmentation is rudimentary, as the image is partitioned into blocks rather than irregular segments. In the preferred implementation the blocks are of size 16×16 pixels. The problem with this approach is that the blocks may overlap boundaries of image regions, resulting in incorrect image measures. In addition, the nature of the block size implies that if they are to encapsulate a given feature scale for a given region, the block size will prove wasteful or too small for accurate neighboring region classification if the scales differ between these regions.

Problems

Existing techniques that match on regions tend to either provide potentially inaccurate results due to the inaccuracy of the segmentation, or apply measures of multiple segments to reduce the inaccuracy, at the expense of specificity. This precludes the possibility of queries based on a single region, unless by chance multiple segments in both source and destination contain the characteristics of that region. The accuracy of matching of specific regions would be improved by the application of better segmentation techniques, designed to facilitate this goal.

In addition, inaccurate results from segmentation techniques lead to problematic usage in image editing applications. User identification of a desired segment is uncertain to achieve a desired result, as segments may cross the boundaries of that which the user considers a discrete region, or may over-segment images into a confusing patchwork which the user must merge to make useful. It is difficult to create a segmentation technique that would match user criteria, but a technique that instead identified salient sub-regions may have greater utility.

OBJECTS AND ADVANTAGES

One advantage of homogeneous region detection is that it uses region growth, but need not complete segmentation. This overcomes the issue of when to terminate region growth, as strong characteristic portions of a region can be identified independently of a high confidence region boundary identification. It also does not require pre-known parameters to determine clustering partitions.

The usage of multiple sample areas to measure a homogeneous region leads to a sharper definition of a boundary of a segment, or an improved ability to detect a small region as being distinct from surrounding pixels. Consider a very small region that is long in one dimension and thin in the perpendicular dimension, or one where one part of a region is a narrow corner. Use of a single regular sample area, such as a square or circle to sample the region may overlap into neighboring regions, diminishing the chance that a narrow region component will be detected. Use of varying shaped sample areas can better enable such cases to be correctly detected, and the resulting derived image measures will more accurately characterize the region. This also makes optimal use of a given sample size of pixels, and hence the amount of artifacting due to sampling a wide area is minimized.

The shape of the best response sample area can also indicate additional characteristics about the segment. A best result from a highly asymmetric shape may indicate that the texture pattern is asymmetric, or that the segment is extremely narrow at that point. Further analysis can distinguish the two.

There are additional benefits from permitting the sample area to be offset from a centered position relative to the basis pixel. If the best resulting sample area is one that is not centered on the basis pixel position for this measure, this can indicate the measure is close to the edge of a region. The farther the sample area is offset from being centered, the more likely this conjecture is true. The shape of the edge, such as a flat or a corner structure, and at what orientation the border is situated can be deduced from the offset and asymmetry of the optimal sample area. For example, a large offset to the bottom left and a very asymmetric pointed shape would indicate a well-defined narrow corner or spike like edge to the top right of the current position being considered. This method can be used as a sensitive edge detector.

A further advantage is that borderline pixels in narrow regions can be better classified. Demanding a filter region centered on the candidate pixel is likely to overlap other regions in border cases. Offsetting the sample area from the center allows such cases to be considered. This might lead to erroneous results, but the basis pixel test of membership of the sample area minimizes such errors.

The homogeneity technique produces a continuous value, rather than a discrete judgment as to which segment group a candidate pixel belongs to. This leads to several advantages. A wide variety of segmentation techniques have been created to segment medical imagery, based on continuous measures. Much medical imagery is grayscale, and hence techniques such as level sets can robustly determine bounded regions that have an interior value lower or higher than the boundary. Such techniques can easily be applied to the results of the homogeneity measure. In addition, the continuous nature of the measure output means that classification can be deferred or easily weighted by external factors. A user may desire to influence segmentation choices, or a high level module may weight segment classification based on matches with object shapes. The continuous nature of the homogeneity measure enables such high level influence to be readily integrated.

In one embodiment of the present invention, multiple homogeneity measures might be applied. Segmentation algorithms may make use of multiple filters to detect distinct regions. However, it is difficult to mix filter-based techniques with other techniques such as histogram techniques. This is because the range, number, and characteristics of the results of such techniques vary significantly. It is far easier to compare like with like, such as comparing or clustering the outputs of a range of filters, or a range of histograms, but not such techniques with each other. However, the homogeneity measure makes this comparison internally, so the segmentation algorithm does not require information as to which specific techniques were used. It receives a single continuous value per technique used to rate the homogeneity. The results are far more easily integrated into an overall segmentation algorithm.

The homogeneity measure may be applied at many scales, and the best region at any scale may be chosen with the knowledge of the scale at which they were detected. The scale information, in combination with an identified region size at that scale allows an optimal texture scale to be chosen. This allows a fully automated way of determining the strongest common surface based scale. Hence, even if a surface such as a fabric is heavily patterned into large areas, the algorithm can still automatically detect that within the image composition, the entire surface is itself a region, and may be chosen as the representative region for that portion of the image over and above the individual components of a region. This solves the problem of ambiguity, in that a region may be composed of sub-regions. Sub-regions are normally more easily selectable by a user with existing tools such as the Photoshop Magic Wand. Our approach makes far easier the identification of wide scale regions.

Oh (2001) applies a filtering algorithm to distinguish lighting effects from that of texture. They do not claim that these are the true texture and illuminance, instead providing a way of factoring low frequency variations. Our proposed method, by automatically determining a representative scale and texture characteristics allows a far better means of separating lighting effects from texture. This in turn provides an improved means for determining illumination invariant texture properties and improved lighting measurement. As the method is automated, it can in turn be fed back for an improved segmentation, and so on until the results converge on an acceptable solution.

As segments are automatically detected at a minimum scale required, the measure is as local as is possible while still encompassing variations such as texture. This minimizes artifacts due to sub-texture components. For example, a texture could contain significant areas of single solid colors, where each such area might by itself be classified as a region. By rating potential segments through a combination of the homogeneity measure with the area of contiguous low homogeneity, it is possible to discover that the broader textured region is a better candidate of a single surface representation than individual homogeneous components of the texture. At the same time, detection of the most localized measure of homogeneity minimizes artificial splitting due to other effects such as lighting variations. Of course, it may be that it is desirable to further segment based on lighting, to detect shadows. However, once the underlying material characteristics of a homogeneous region are known, it is possible to more accurately detect the lighting characteristics, especially in areas where texture provides a signal that dominates that of lighting variations. Hence, shadow boundaries may be more accurately computed.

The initial stages of the algorithm involve loosely determining segments based primarily on their local homogeneity at the best scale detected. This involves no pre-judgment as to the characteristics of the image, and hence need not be dependent on image knowledge or a-priori constants. Hence, the method can be effective without training, estimates as to classes of segmentation, or limitation to specific classes of problems such as sky segmentation. At the same time, our results may be improved by the addition of such approaches.

Our resulting measures may act as a set of seed or training values to improve the results of other segmentation techniques, or fully automate them without their own a-priori assumptions. For example, Malik (2001) requires an assumption as to the value for k to apply the k-means algorithm. The results of our method may be used to determine an initial value for k automatically, as the number of strongly homogeneous values with distinct scales and image measures may constitute a measure of the number of unique region characteristics within an image. The data may also be used to automatically create training sets for neural network classifiers, and to detect distinct regions that may match the criteria of a specific algorithm, such as a sky classifier.

Improved computation of the scale of the texture minimizes sampling and filtering artifacts, improving the sharpness of detected segment boundaries and edges.

As the initial method for detection of homogeneous regions is continuous, it may be loosely applied to detect areas of strong homogeneity. Region based matching in applications such as CBIR is problematic due to the ambiguous results of segmentation methods currently in use. By detecting only the strongest signatures in the cores of regions, the issue is side stepped, as ambiguous border conditions are minimized. The results may be utilized for region classification, as distinct areas of an image with strong homogeneity signatures are likely to be good candidates for automatic extraction of a measure of significant surfaces within an image. These characteristics may then be used to provide an improved classification of an image, for example by the arrangement and composition of the regions and possibly the lighting detected. This may in turn be applied to image-based search. A key advantage is that a strongly homogeneous region is likely to give a much cleaner and more distinct image measure signature than techniques that measure an entire segment, improving the potential for good characterization and distinction from other similar regions. This in turn may improve search results, as an improved classification will lead to an improved match with search candidates.

Automated search by analogy may also be applied as a result of this invention. For example, given an image with components already classified, matching materials in another image may infer a similar classification. (Chen and Wang 2002) apply overall measures to regions within an image, but due to inadequacies in image segmentation techniques they rely on multiple regions being matched using fuzzy logic, so the technique degrades as the query becomes specific to a portion of an image rather than the entire image itself. They cite the issue of automated segmentation being inaccurate, and hence multiple regions must be used, limiting matching to that of a large portion of an image or an entire image. By determining regions of strong homogeneity, our method is more likely to find distinct area signatures, and by automatically determining the layout of these regions achieves a richer form of compositional classification. Clearer and richer information is likely to lead to improved classification results, or improved application of existing algorithms. U.S. Pat. No. 6,181,818 to Sato, et al. is an example of an algorithm that could be improved by this process. This also makes possible more reliable matching of individual regions to each other.

In the domain of CBIR, improved automated classification of individual regions within each of a set of images within a database makes certain searches practical. Specific examples apply to searching for image content where a text description is not available or applicable. To illustrate, the user may find an image containing a desirable curtain fabric, and wish to determine the manufacturer. In a preferred version of the invention, a user may indicate the region of interest, and the strongly homogeneous region or regions within the area of interest are utilized to derive image measures. These may be in turn matched against a database of whole image measures and measures of segmented regions and/or strongly homogeneous regions. Data associated with the resulting image sources may then be analyzed to derive information such as the manufacturer. In addition, the user may wish to find matching items for sale unavailable from a manufacturer, such as an antique no longer made. The same classification and search method may be applied, this time to find articles including images on auction sites such as EBay, or historical sources such as image archives. A user may also like to discover the name of an object or material, and conduct a search in a similar manner. An advantage of the invention in regard to CBIR is that the search material can include image data that is not explicitly designed for this use.

A further advantage within the field of CBIR of fully automated classification of sub regions of a large set of images is that more complex searches become much less labor intensive. Example queries include intelligence analysis and historical research. For example, an image may be a research candidate, where the location or date may not be known. By finding associated individual items within the image, and tracing those back to individual objects in other image contexts, it may be easier to determine the information required in an automated or semi-automated fashion. The method may also aid in the determination of inappropriate content, as by searching related imagery it may be determined that an unusual or inserted element of an image is present. As stated earlier, use of strongly homogeneous areas for classification is likely to lead to more accurate image measures, and hence more accurate search results.

An advantage of our invention is that the strongly homogeneous information may be used to extract visual information for use in drawing operations. A strongly homogeneous region is likely to contain a visually representative portion of the segment or image, and is less likely to contain artifacts and leakage from other segments. In addition, the scale of detection is likely to demonstrate a scale at which repetition of the material characteristics occurs. This can be utilized by methods such as Hertzmann et al. (2001) to create repeatable and extendable synthetic images of a material. The Hertzmann et al. (2001) method requires a user to manually identify portions of the image to be treated as a singular material. The invention detailed in this disclosure allows a partially or fully automated identification of such regions. Such information can then be applied to a variety of uses, such as replacing a segment of an image with a representation of another surface material in the same or another image, including an improvement to the Adobe Photoshop rubber stamp tool. For example, it may be desirable to replace the fabric of a bed covering with that of another fabric visible in that or another image, where an idealized manufacturers sample is not available. In addition, it may be desirable to remove a portion of an image, such as in viewing an image of a room with an article of furniture removed. By identifying regions near the chair that exhibit strong homogeneity signatures, it is more likely that a good texture can be utilized to replace the image area that has been removed.

Region segmentation tends to generate inaccurate results that over or underestimate the extent of what the user may perceive as individual regions. By only measuring results with a strong signature through the homogeneity measure, it is under segmenting the image, but the remainder need not be treated as segments. This permits regions of uncertainty that can be arbitrated by other segmentation algorithms or by the user through selection tools for improved segmentation and selection results.

Multiple scale information results from our method. Once a dominant scale for a region is found, encompassed sub regions or encompassing poorer fit regions can be associated by spatial overlap with the dominant scale region. This has a variety of applications. If a peripheral overlap of two regions at two similar scales occurs, and the image measures of those regions are a close fit, it may be inferred that the same material is present, having undergone a transformation of scale. This may allow shape to be inferred. Given a common regular texture, methods exist to determine shape from repeats of the pattern or from shading information. Our novel method allows shape to be determined where irregular patterns are present. Additional analysis, such as spectral characteristics of the texture, can be used to determine orientation.

As many regions at many scales exist, highly complex spatial relationships may potentially be inferred. A web of segments at different but neighboring scales, with similar material characteristics may be built. This permits detection beyond that of simple shapes. A set of segments in a line or curve with incrementally changing scale can be used to derive a fully three-dimensional trend. Other similar regions that overlap the trend can be used to infer more complex variations within it, or to identify differing shapes off to either side. Unlike geometric shape or plane-based methods, this may be used to detect non-linear changes including curvature, to characterize soft objects such as pillows and beds, or natural objects such as hill slopes. Other techniques, including feature matching and shape from shading, can complement and enhance these results.

A further advantage of the method is the relationship between strongly homogeneous regions of the dominant scale and those at a non-dominant scale that are enclosed or that surround that at the dominant scale. Such relationships may be utilized to infer structural information about the region with a higher degree of confidence. For example, a large dominant region composed of a variety of much smaller regions with varying shades of green could be inferred to be part of a shrub or tree.

Fusing of multiple scales of imagery may also lead to sharper image segmentation. Consider a bed with a quilt work fabric pattern. The overall quilt region may be determined to be one segment, but the number of samples required at a given scale to determine membership of a region may be large. This can lead to segment boundaries that are blurred or uncertain. However, by recognizing that more detailed scale regions are members of the overall quilt region, their boundaries can be incorporated. As these boundaries are measured at a finer scale, they are likely to be sharper and better defined, and hence improve the overall quality of the segmentation of the quilt area.

Use of multiple shapes, orientations, and offsets as the filter window of the homogeneity measure permits a process of progressive refinement. Image segmentation algorithms tend to be computationally expensive. Our technique is open to generation of fast approximate results, by use of a single or limited set of shapes. Increasing the number of shapes used can improve the results. In addition, these shapes may be used in limited circumstances. For example, a large area of good homogeneity is unlikely to require additional analysis, whereas border cases exhibiting poor results could be further analyzed with a greater range of shapes. This can lead both to a fast initial approximation, and to an overall reduction in the time required for an accurate result, as intensive analysis need only be applied in border cases.

DETAILED DESCRIPTION OF THE INVENTION

Figure 1:
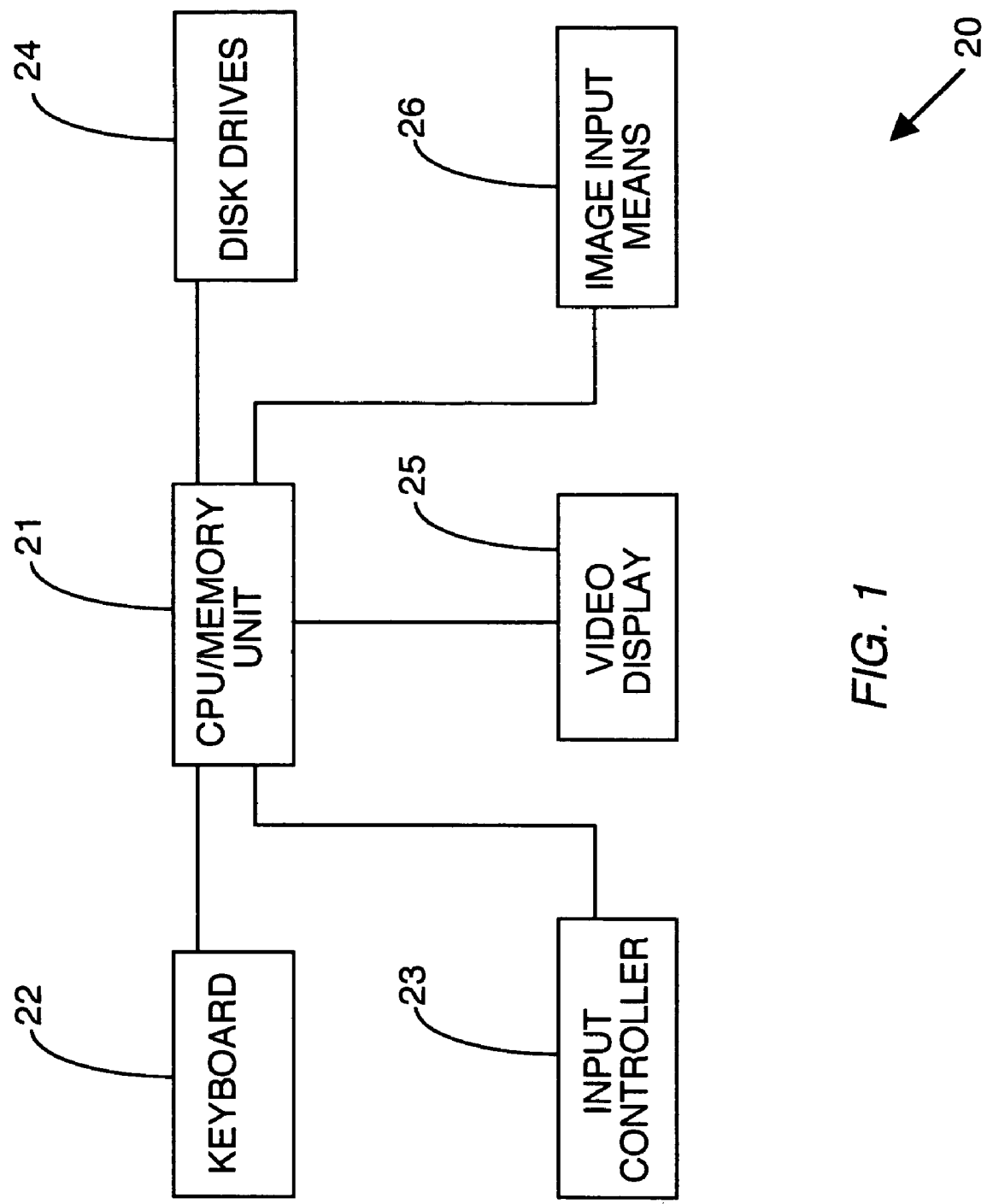
FIG. 1 depicts a generalized block diagram of a computer system as might be used by the present invention.

The present invention generally involves the analysis of digital image data. It is helpful to provide a brief discussion of the pertinent computer environment. FIG. 1 is a generalized block diagram of an appropriate computer system 20, which includes a CPU/memory unit 21 that generally comprises a microprocessor, related logic circuitry, and memory circuits. If editing operations are to be performed with manual assistance, a keyboard 22 provides inputs to the CPU/memory unit 21, as does a two-dimensional input controller 23, which by way of example can be a mouse, a 2-D trackball, a joystick, a stylus, a touch screen, a touch tablet, etc., with a mouse being preferred. Disk drives 24, which can include fixed disk drives or forms of data storage and access over a network, are used for mass storage of programs and data. Display output is provided by video display 25. Image data may also be input to the system locally or over a network via an image input means 26, including scanners, digital cameras and storage devices.

Terms

A number of terms are used herein to describe images and related structures, and the terms defined below have the meanings indicated throughout this application, including the claims.

A bitmap or digital image is simply a set of values representing N dimensional information. N is usually 2 for common content obtained via digital cameras, video cameras, scanners and other means. N may be 3 for applications such as volumetric medical imaging or atmospheric and oceanographic analysis. Each location or single picture element of an image may be called a "pixel".

The present invention could be used with any bit-mapped representation. Commonly, the sets of values consist of a color space such as red, green and blue (RGB) levels. In a preferred embodiment of the invention, sets of values are used that in some way decouple color and luminance information. For example, HSV or YUV color space representations decouple the luminance into a V value, and color into a two-channel HS or YU representation. See Foley (1990) for details. Such a representation is desirable, as having color values that are more independent of luminance allows greater consistency at differing illumination levels. These spaces allow better comparison of image analysis techniques, as the color components have more consistent values under changing illumination conditions. However, any set of information per pixel may be utilized with the present invention.

Figure 3:
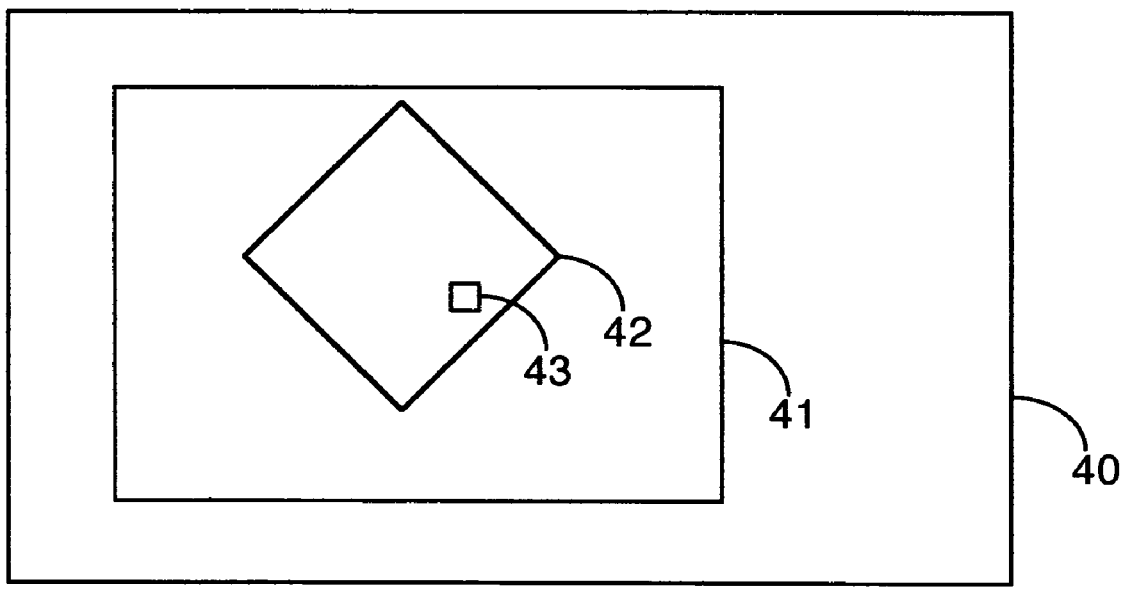
FIG. 3 depicts the relationship between a bitmap, a bitmap area, a sample shape and a basis pixel.

The present invention may be applied to the entire bitmap 40 (FIG. 3), or to a portion of it, and either may be described by the term "bitmap area" 41 (FIG. 3). This may be desirable in the light of user interaction, or to facilitate a saving in computational time. In addition, the bitmap area may represent a sub-sampled portion of the bitmap or the entire bitmap at full resolution. This may be desirable if multiple scales are to be analyzed, as sampling allows an approximate analysis of the data. In addition, it may be desirable as some compressed digital image formats exhibit artifacts when decompressed to a bitmap. Such artifacts may provide spurious texture and segmentation results. Sub-sampling and filtering may overcome such errors.

Image measures are analytical operations performed upon individual pixels or groups of pixels that provide a resulting value or values. Image measures are normally applied to identify a desired characteristic. They can include histograms, filters, and feature detection algorithms.

The strength of an image measure is the degree to which the specific pixels being examined return a clear fit to components of a measure, and a poor signature for other components of this measure. Examples include oriented filters, where a small number of orientations return a high signal, and other orientations return a relatively low signal. In the case of histograms, one indicator of strength would be that a limited number of high peaks would be observed, and other histogram bins would return relatively low frequencies. In the case of k-means and other cluster analyses techniques, analysis would return membership of a limited number of clusters, with poor results for other clusters.

Segments are a common term within image processing, indicating a region of a bitmap that is usually contiguous. A user may indicate it, or it may be automatically generated as a result of some common property of the region or a relationship between that region and others. A segmentation algorithm attempts to take an image and divide it into segments. Usually, a segmentation algorithm attempts to allocate all pixels to membership of one segment or another. One aspect of the present invention is that this may not always be required, and it is sometimes desirable to allocate pixels to segments depending on their strength of membership, and leave some pixels as unassociated with a segment.

A further concept based on strength of membership is that of a representative portion of a segment, where a portion of it that exhibits a strong image measure signature may characterize the entire segment. The entire segment need not be discovered to find a representative portion. The segment could be discovered first and then the representative portion, or the representative portion could be used to discover the entire segment.

Context based image retrieval (CBIR) uses image measures including segmentation to classify and retrieve image data. Applying the technique to an entire image or subset of the image, for many images, and storing that information in a database normally facilitates this. The same measures are then applied to a new image or the measures are expressed directly through classes, and matches are retrieved from the database.

In the present invention terminology, a basis pixel 43 (FIG. 3) is a location, candidate pixel or small region within a bitmap or bitmap area for which a value is being calculated. For area based calculation, an area or sub area contains a pool of one or more samples that is utilized in the calculation of image measures.

A sample area 42 (FIG. 3) is a portion of a bitmap within which measurements may be gleaned relevant to a value associated with the basis pixel. Under the preferred embodiment of the invention the basis pixel should lie inside the sample area. Sample areas may or may not exceed the boundary of a bitmap area, but should not exceed the extent of the bitmap, as missing samples may create a misrepresentative measure.

A difference measure is a calculation used to measure the degree of similarity between two sets of data. In the preferred embodiment of the present invention, measures such as chi-squared or mean squared difference are applied. The resulting difference measure for two nearby areas of the bitmap area characterize how similar any resulting image measures are.

Overview of the Steps in a Preferred Embodiment of the Invention

Figure 2:
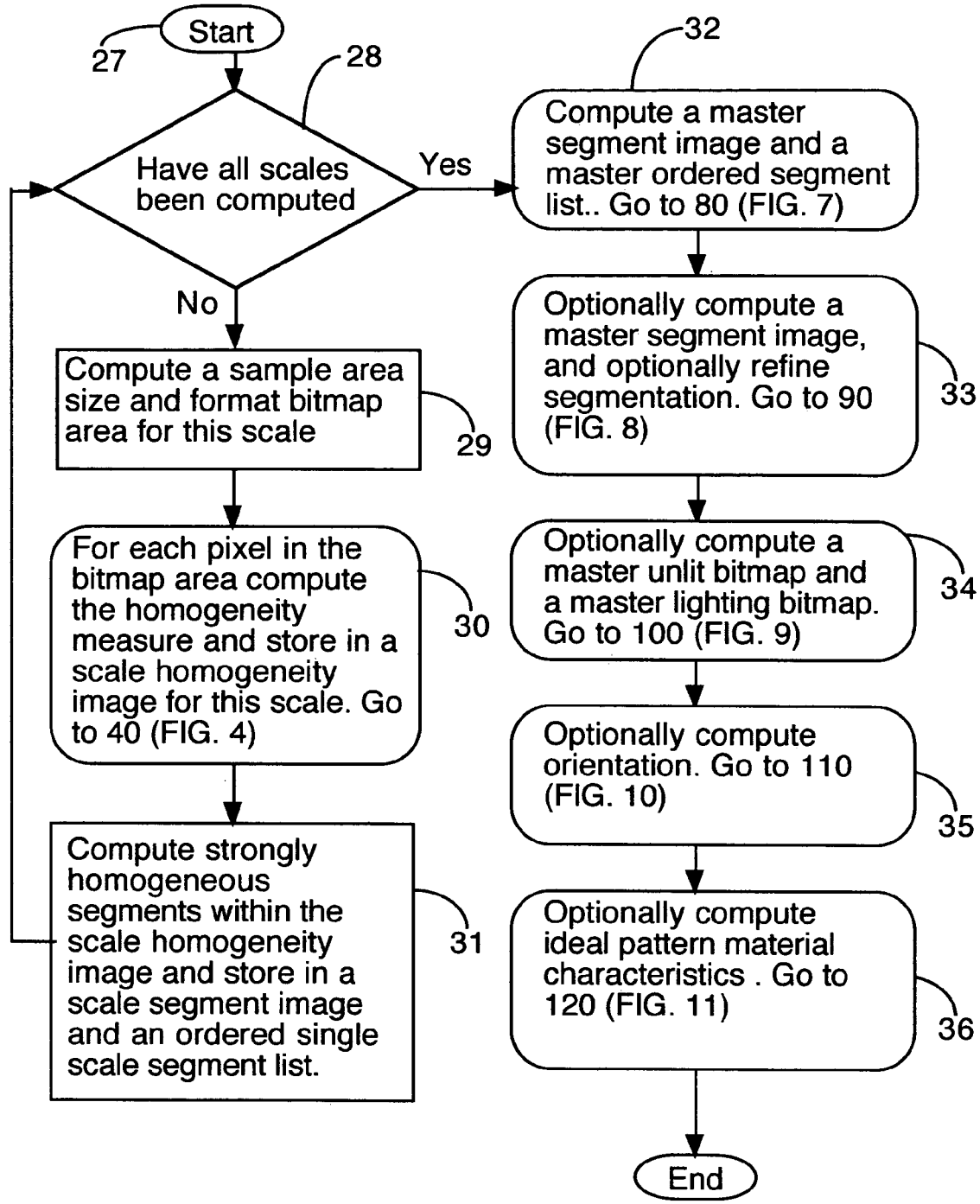
FIG. 2 is a flowchart describing a preferred implementation ordering of the processing steps of the present invention.

FIG. 2. provides an overview of the desirable and optional steps involved in the present invention. At the start 27 of the process an image is present in a bitmap form within the computer/memory unit 21. At this point a range of scales is selected for analysis. This range is implementation dependent. In the preferred embodiment, the original bitmap or a portion of it is used or is sub sampled, where the number of original bitmap samples now incorporated per bitmap area pixel determines the scale of the sub-sampled result. Other embodiments of the invention are possible. For example, no resampling need take place, and instead components of the homogeneity measure to be detailed could be increased in size. The scale limit determination should be adjusted for these differing constraints. Sub sampling is preferred, as it is computationally efficient.

In the following description, a largest scale is used to describe the most subsampled form of the bitmap area utilized. A smallest scale is used to describe a bitmap area that has been minimally resampled, and may possibly involve the original bitmap area data.

The largest scale is limited by the size of the subsequent resampled bitmap area, as there need to be sufficient pixels that a reasonable number of samples are present in order to detect distinct segments. In our implementations, we have found a value of at least 500 pixels is required as the minimum bitmap area size. The smallest scale is absolutely limited by the resolution of the original bitmap. However, it may be desirable to start at a larger scale, either to speed computation, or to avoid artifacts from image compression schemes. In the case of a common scheme such as JPEG, color information may be severely effected in 8×8 blocks, so a sub sampling of at least 8 will give ideal results. The number of scales will also depend on the factor of sampling difference between each scale. In the preferred implementation, a scale factor of 2 or root 2 is useful, as it provides sufficient commonality between scales for some of the techniques to be described later, while being readily implemented within a computer system.

For each of the scales 28, the portion of the bitmap is resampled to the appropriate bitmap area 29. Then, in the preferred embodiment of the invention, for each pixel in the bitmap area the homogeneity measure is then computed and stored in a scale homogeneity image for this scale 29. In differing embodiments, the ordering of and number of pixels that the homogeneity measure is computed for may vary. For example, in one embodiment of the invention, an initial measure may be computed, and then refined with more detailed computation later. If the homogeneity measure returned is good, no more computation may be needed. If the result is poor, further analysis may be required, in order to distinguish a poor homogeneity result from one where an insufficient set of techniques have been applied to determine an accurate value.

The order of computation of the scales is dependent on the usage of the data. In the case of CBIR for entire images, it may be desirable to compute the largest scales first, as these are more likely to indicate large image structures, and further computation may be deferred. It may be desirable to defer computation of certain scales to a later time. The preferred embodiment of the invention involves all scales being computed prior to other operations. It may also be desirable in some circumstances to compute an approximation at all scales first, and refine the results later. These choices are given as suggestions, but should not limit the scope of the implementation.

Figure 4:
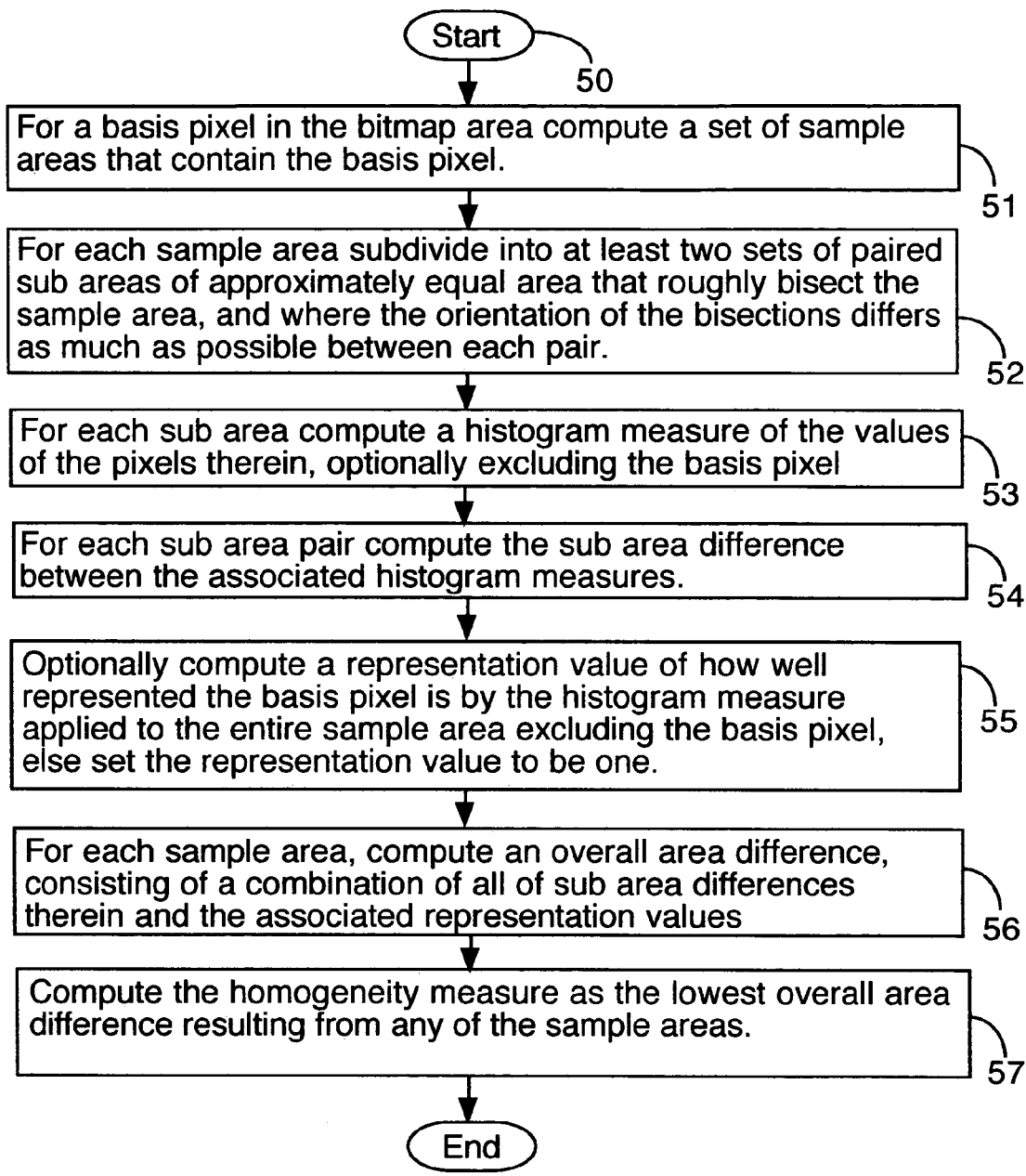
FIG. 4 is a flowchart describing the processing steps of computing a homogeneity measure for one sample pixel used by the present invention.
Figure 5:
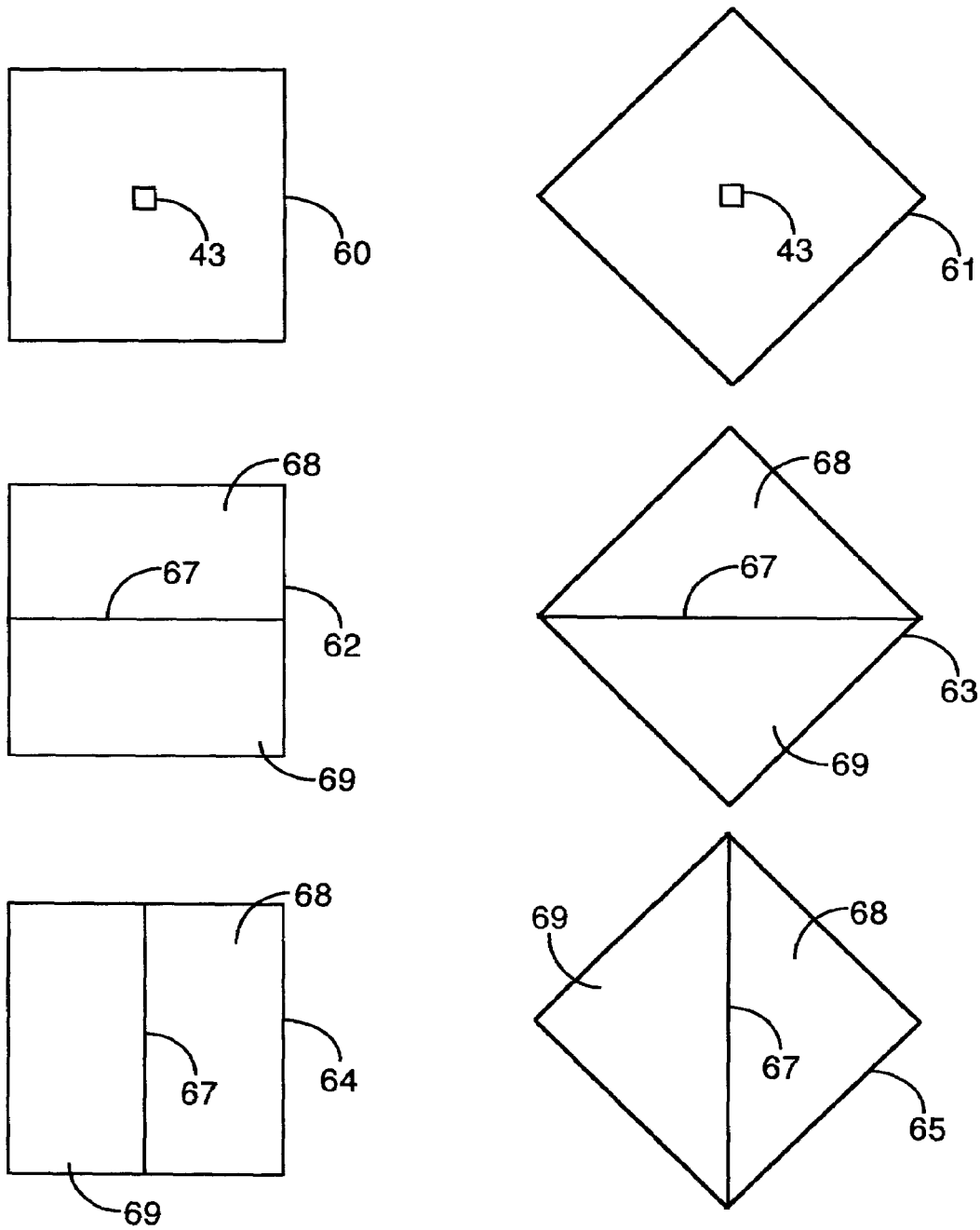
FIG. 5 depicts two example symmetric sample areas and perpendicular bisections of these sample areas into pairs of sub areas, to be applied as homogeneous measure area extents for one basis pixel in an image.

At a given scale, for each pixel in the bitmap area, the homogeneity measure is computed and stored in a scale homogeneity image for this scale 30. For additional details as to this process, please go to 40 (FIG. 4).

Once sufficient homogeneity values for a scale are present, the homogeneity image is segmented 31. In the preferred embodiment of the invention, the homogeneity image consists of a single value per bitmap area pixel, where a low value represents good homogeneity, and a high value represents poor homogeneity. Many standard segmentation algorithms exist to deal with such data, including area growth, level sets (Adalsteinsson and Sethian 1995), or boundary detection, such as (Meer and Georgescu 2001).

A strongly homogeneous value is one that is exceptional in relation to those of the entire bitmap area. In the preferred embodiment, they could be below the average or one standard deviation below the average of the entire bitmap area, but many techniques are possible.

A strongly homogeneous region is a portion of a bitmap area, all of whose elements exhibit a strongly homogeneous value. Within the preferred embodiment, the sum of all such extents may partially or completely cover the bitmap area. Within the preferred embodiment, the segmentation is initially limited to strongly homogeneous regions. This is recommended, as region growth algorithms can sometimes overrun desired segment boundaries, or have undefined termination conditions. By initially limiting the segments to those values that exhibit exceptionally good behavior, the result is more likely to be very reliable. These strongly homogeneous regions will be used later for characterization of the segment. A complete segmentation can be forthcoming later, by extending the existing homogeneity segments or by applying the segment characteristics as seed values for other segmentation algorithms. For example, algorithms such as k-means can apply the segment information as an initial guess for k, and neural network based segmentation can use the results as automated training sets for well defined segment characteristics.

The results are then stored in a scale segment image and an ordered single scale segment list. The list consists of references to the detected segments within the scale segment image, and may contain additional information such as segment extent and area.

Figure 7:
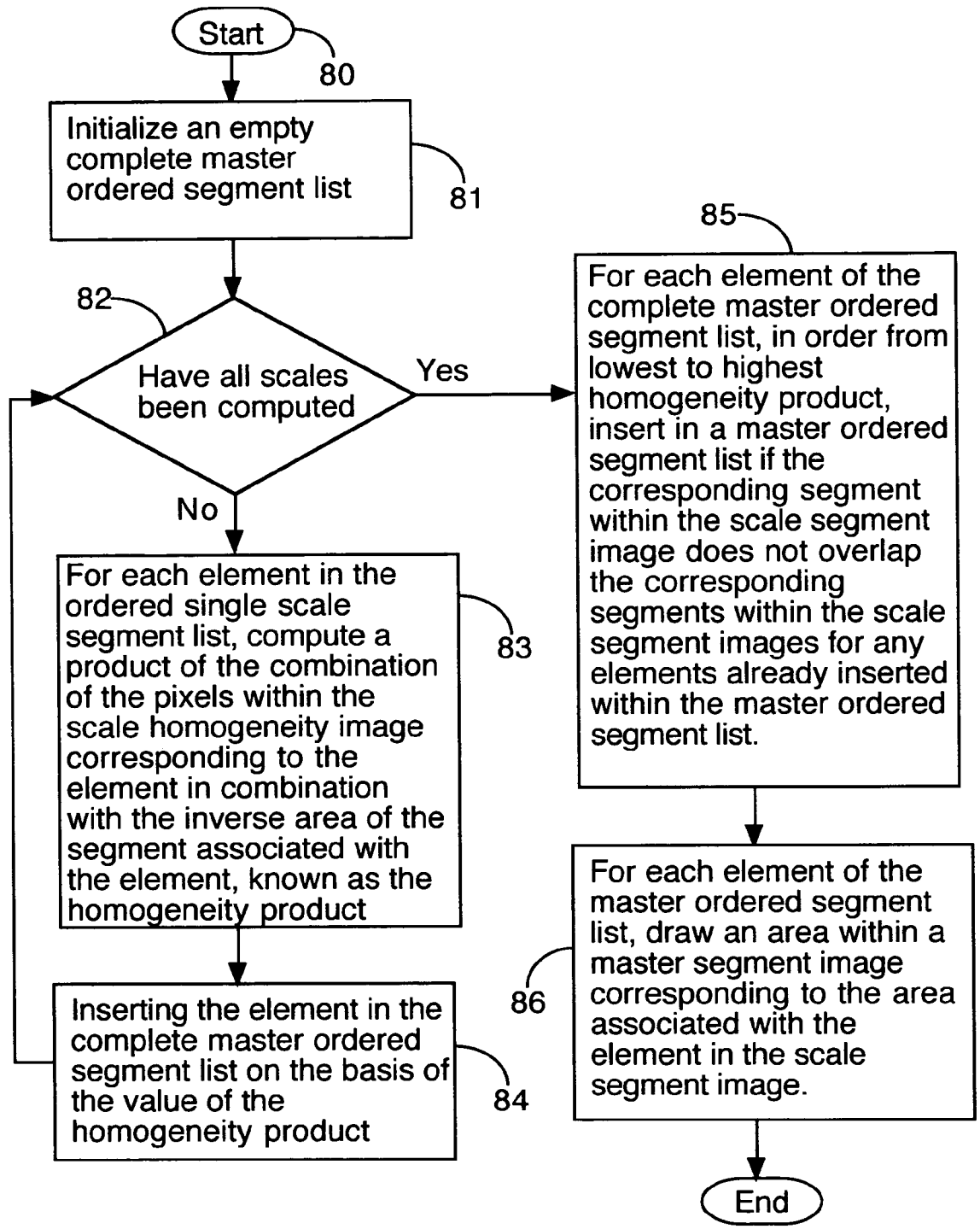
FIG. 7 sets forth a flowchart describing the processing steps of computing a master segment image and a master ordered segment list.

The next step is to compute a master segment image and a master ordered segment list 32. The information gleaned from specific scales already computed is analyzed. Greater implementation detail is available at 80 (FIG. 7). Other embodiments are possible. For example, if computation of some scales is deferred, this step may produce provisional information, and may be repeated or refined at a later time when additional scale information is available.

Figure 8:
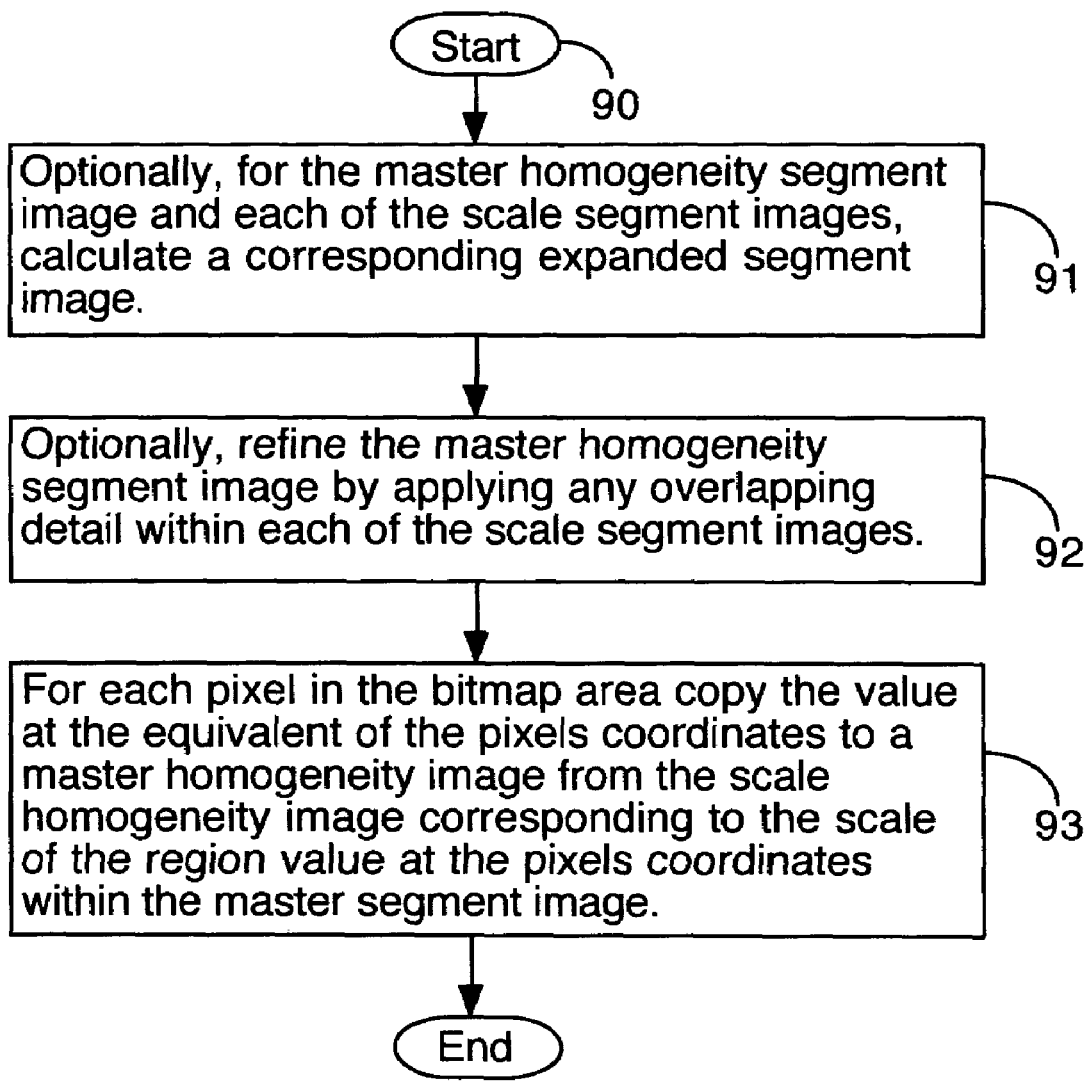
FIG. 8 is a flow diagram for refinement of the master segment image and list using overlapping segments at different scales.

In a further optional step the segmentation may optionally be refined, and optionally a master homogeneity image is computed 33, by using the existing information as a seed for a segmentation algorithm. For additional detail, please go to 90 (FIG. 8). This step need not be applied at this point, but is in a preferred embodiment of the invention as a large amount of initial homogeneity and segment information has been obtained at this point. Hence, there is a wealth of information on which to base an improved segmentation. The goal of creating a master homogeneity image is to combine the information as to the best representative regions from any scale, and gather the homogeneity information from those scales.

However, other orderings may be desirable, and this embodiment should not limit such possibilities. For example, an improved segmentation may be possible once some of steps mentioned below have been computed, as such information may be used to create improved homogeneity measures and other information. Hence, a variety of options, including repeating these steps multiple times in the same or differing orders or in a simultaneous fashion may be desirable. Identification of strongly homogeneous segments is recommended in the preferred embodiment, as it may be used in a later step of identifying material characteristics.

Figure 9:
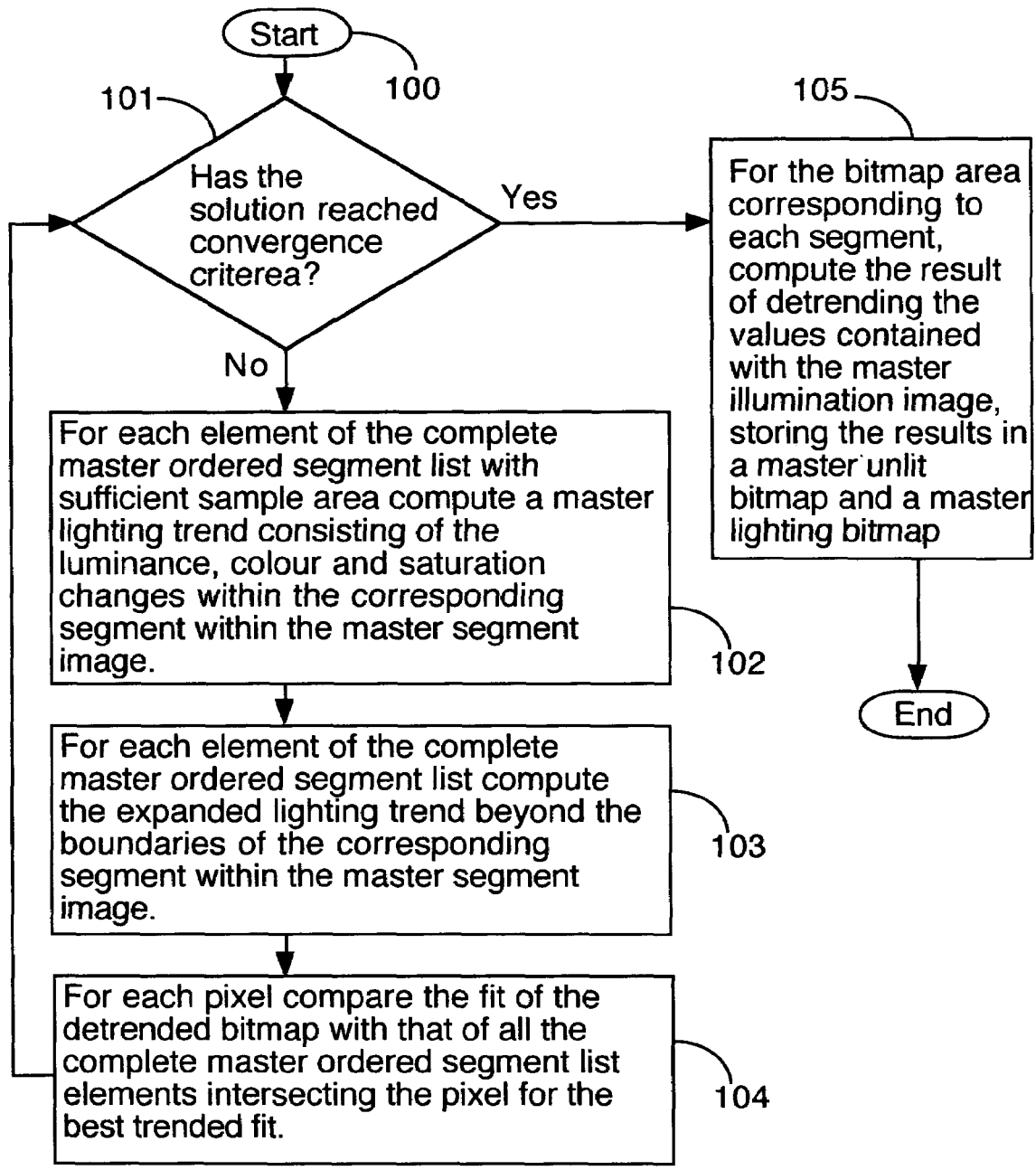
FIG. 9 is a flowchart describing the processing steps of distinguishing lighting information from the surface texture of the identified image segments.

Understanding of the image data may be further improved by the optional computation of a master unlit bitmap and a master lighting bitmap 34. Under a preferred embodiment, decoupling of the lighting effects from the surface texture may be utilized to compute an improved homogeneity measure, as illumination variation effects on image comparisons will be minimized. Material characteristics may also be more easily determined from a texture surface whose illumination is more normalized. In addition, shape from shading algorithms using the master lighting bitmap may aid in determining surface orientation and shape. Finally, editing operations, where a surface texture is replaced, or the lighting is altered will produce more consistent and realistic results if the lighting and surface texture are decoupled to some extent. Further details are given in 100 (FIG. 9). As above, the ordering of this step may be altered, or it may be executed in parallel with other steps. This may be desirable, as feedback from a later stage such as measuring material characteristics may feed into a better decoupling of illumination and texture.

Figure 10:
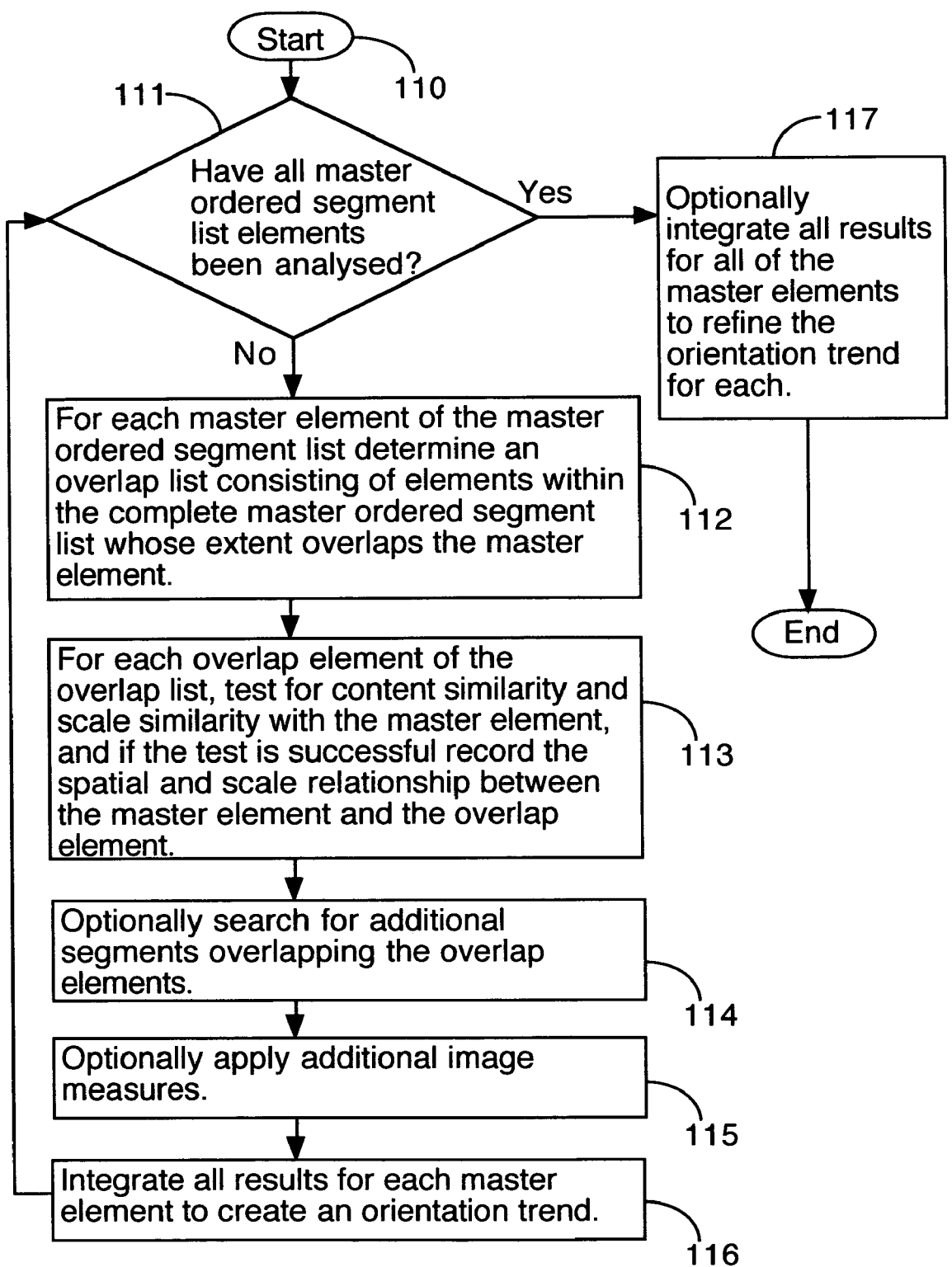
FIG. 10 is a flow diagram for determining orientation and shape of the image segments.

In the preferred implementation of the present invention, a further optional step is the computation of orientation and ideal pattern material characteristics 35. Go to 10 (FIG. 10).

Figure 11:
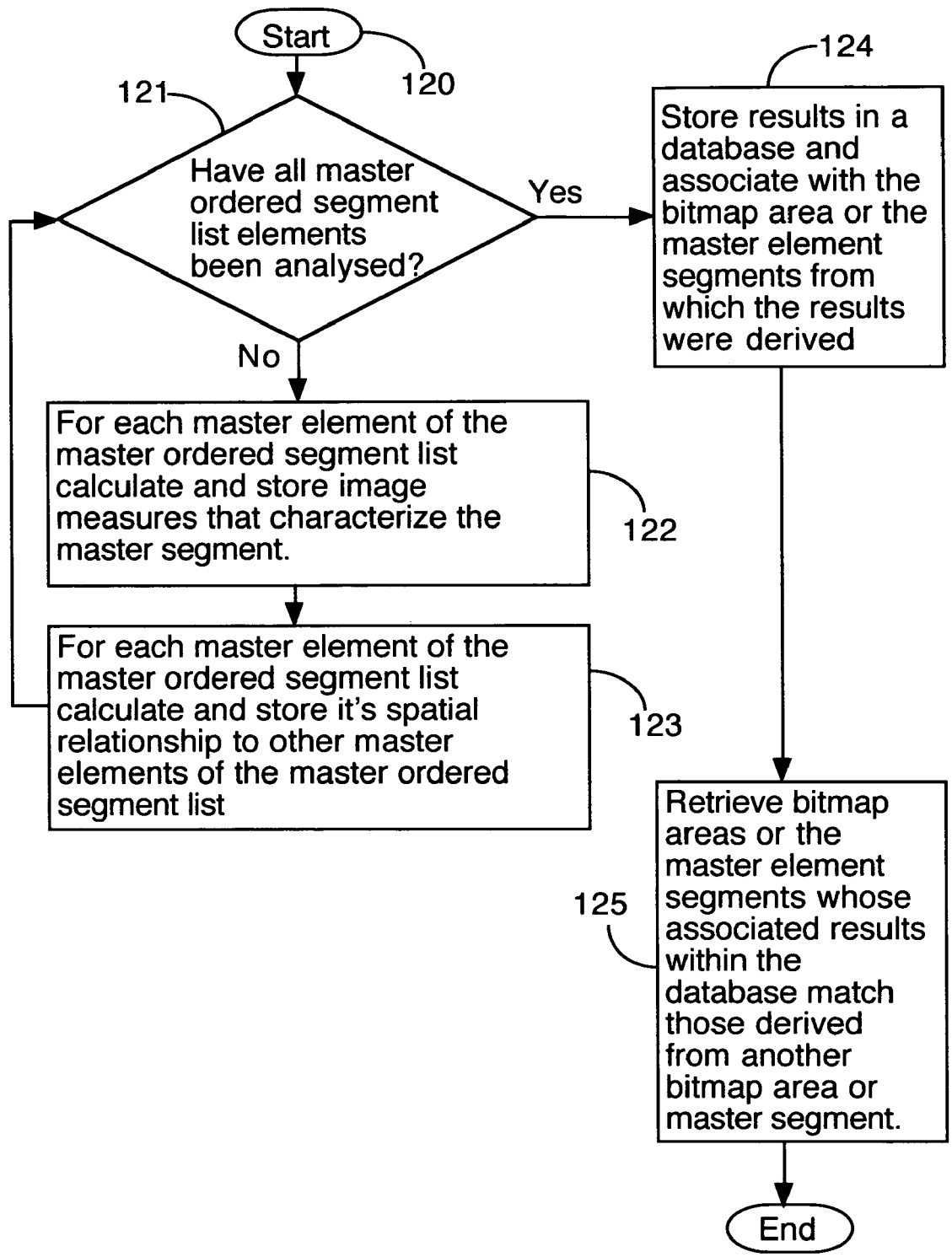
FIG. 11 is a flow diagram for determining material characteristics of the image segments, for use in CBIR algorithms.

In the preferred implementation of the present invention, a further optional step is the computation of ideal pattern material characteristics 36. This may applied to database searches for matching images and sub components. This is useful for applications such as CBIR. Go to 120 (FIG. 11)

Detailed Description of the Homogeneity Measure

There now follows a detailed description of a novel image measure, known as the homogeneity measure (FIG. 4). The overall goal of this measure is that per basis pixel, it can measure how similar an associated portion of the image is to itself. This may appear a strange and recursive concept, and so it is worth explaining it's utility in order to better understand the implementation.

Existing image segmentation techniques surveyed work by classifying pixels using statistical measures including histograms, or by applying a range of filters and seeing which give a strong fit to the pixel region. Clustering pixels that give similar results under these measures then identifies segments. Usually, one technique is used, as it is difficult to compare histogram results with filter results. Another approach is to find edges in the image, and then create partitions using the edges as boundaries. Area growth involves applying filters such as those above and testing for similarity of results in order to join pixels into clusters. Combinations of these approaches are also possible. A common thread to all these techniques is that a two-step approach is present. Image measures are calculated. Following this, segmentation occurs through taking the measures and comparing them. If the measures of texture or color are similar to that of an existing cluster, the candidate pixel is joined to that cluster. If neighboring pixels are very similar, an area growth algorithm will consider them part of the same group. If an edge comes between a pixel and a group, the pixel may not be a member of that group.

The homogeneity measure is distinct, as it applies both the image measures and an evaluation of local similarity as an atomic action. Segmentation can then take place by evaluating if local areas share good homogeneity results. If desired, multiple measures can still be combined. This can be done either internally to the homogeneity measure, or through multiple homogeneity measures.

There are several distinct advantages to this approach, which are worth detailing to give a better understanding of the implementation. Area based techniques such as thresholding/clustering or area growth can produce errors at the boundary of segments. This is due to an area measure having to encompass multiple pixels. Filters of 3×3, 5×5 pixels or greater are common, and histograms require a minimal sample size to give valid results. At the boundaries of potential segments, these areas may overlap into other segments, producing unclear results. Classification becomes error prone. In addition, the filter shapes are generally symmetrical, such as for example a circular or square sample area. Such sample areas can miss-classify very small narrow segments, as the filter boundaries may completely span the segment width, leaking into other segments. It may not be possible to identify that a segment is present. A solution is to make the filter smaller, but smaller filters may have insufficient samples to be accurate, or may not be large enough to recognize texture features present that distinguish that segment.

The present invention introduces several novel concepts facilitated by the homogeneity measure process. As there is a local similarity computation, there can be a judgment as to what kind of sample area best represents a similarity measure for a given basis pixel. This opens the novel option of adaptively changing the sample area or selecting from a repertoire of sample areas to apply to the basis pixel locale. Given a genuine segment being one that would be an optimal representation of a distinct region of the data, we now have a way at a very early stage to improve the recovery of that segment. An optimal sample area may be found that fits neatly into a narrow space or tight corner of the boundary of the genuine segment. A further novel option is that such sample areas need not be centered on a basis pixel. At the border of a genuine segment, the optimal measure sample area may be one offset into the segment, but still covering the basis pixel. The result is a choice of sample area, some of which better reflect for a basis pixel which genuine segment it is ideally a member of. The improved sample area selection also leads to a much cleaner set of image measures, as overlap into genuine neighbor segments is reduced, and also results in sharper, better-defined detection of segment edges.

Care must be taken with these techniques. In the case of choosing multiple filters, erroneous results may occur. For example, on a given image texture, some filters may give little or no response, which may be seen as ideally homogeneous as there will be no difference in the results. Hence, prior to selection from a range of filters, pre-processing may be done to evaluate that filters give a sufficient response that they can be validly compared for similarity of results. In the preferred embodiment of the invention, multiple filters need not be used, and a histogram for each bitmap color space component is applied instead.

Care should also be taken with the optional technique of offsetting the sample area from being centered on the basis pixel. In the preferred embodiment, the sample area should always overlap the basis pixel. In addition, an issue may arise for a basis pixel near a potential segment boundary. Given a variety of offsets to choose from, some may cause the sample area to fall mainly in a segment adjacent to the one within which the basis pixel would ideally be classified. To prevent this, we introduce an optional additional weighting. The image measure used earlier is applied to ensure that the sample area apart from the basis pixel is representative of the basis pixel itself. Such a weight will minimally affect a basis pixel well inside a segment, but in border cases will emphasize sample areas that fall within the correct segment.

In differing embodiments, the weight may influence the choice of sample area, after which the homogeneity value is computed, or conversely the weights and homogeneity values for all sample areas may be simultaneously computed and an optimal sample area chosen later. Asymmetric filters can then be applied closer to the edge of a region while still being correctly classified as remaining within that region.

An advantage of these methods is that boundary regions will be better classified, and small and irregularly shaped segments are more likely to be correctly determined. It is also more likely that smaller and more irregular areas will be correctly classified. Finally, the methods potentially allow sharper region boundaries to be defined, as the blurring resulting from symmetric sample filters is reduced.

There follows a detailed description of the preferred implementation of the homogeneity measure, as laid out in FIG. 4.

In step 41, a set of sample areas is computed for a given basis pixel. FIG. 4 shows a possible example sample area 60, and a version rotated forty-five degrees 61. The basis pixel 43 lies within the center of these sample areas. In the preferred embodiment, the basis pixel must be entirely contained within the sample area. These examples are given as they have particular advantages. They are simple, and hence can be computed rapidly. In an optional embodiment of the invention, more orientations of the sample areas may be desirable, and more and differing sample areas may also be desirable. The more orientations and sample areas that are present, the more likely a good classification may be reached. However, more sample areas also involve more computation, so a tradeoff of time vs. fidelity should be judged. It is undesirable that the sample areas should exceed the boundaries of the bitmap, though they may optionally exceed the boundaries of the bitmap area.

Figure 6:
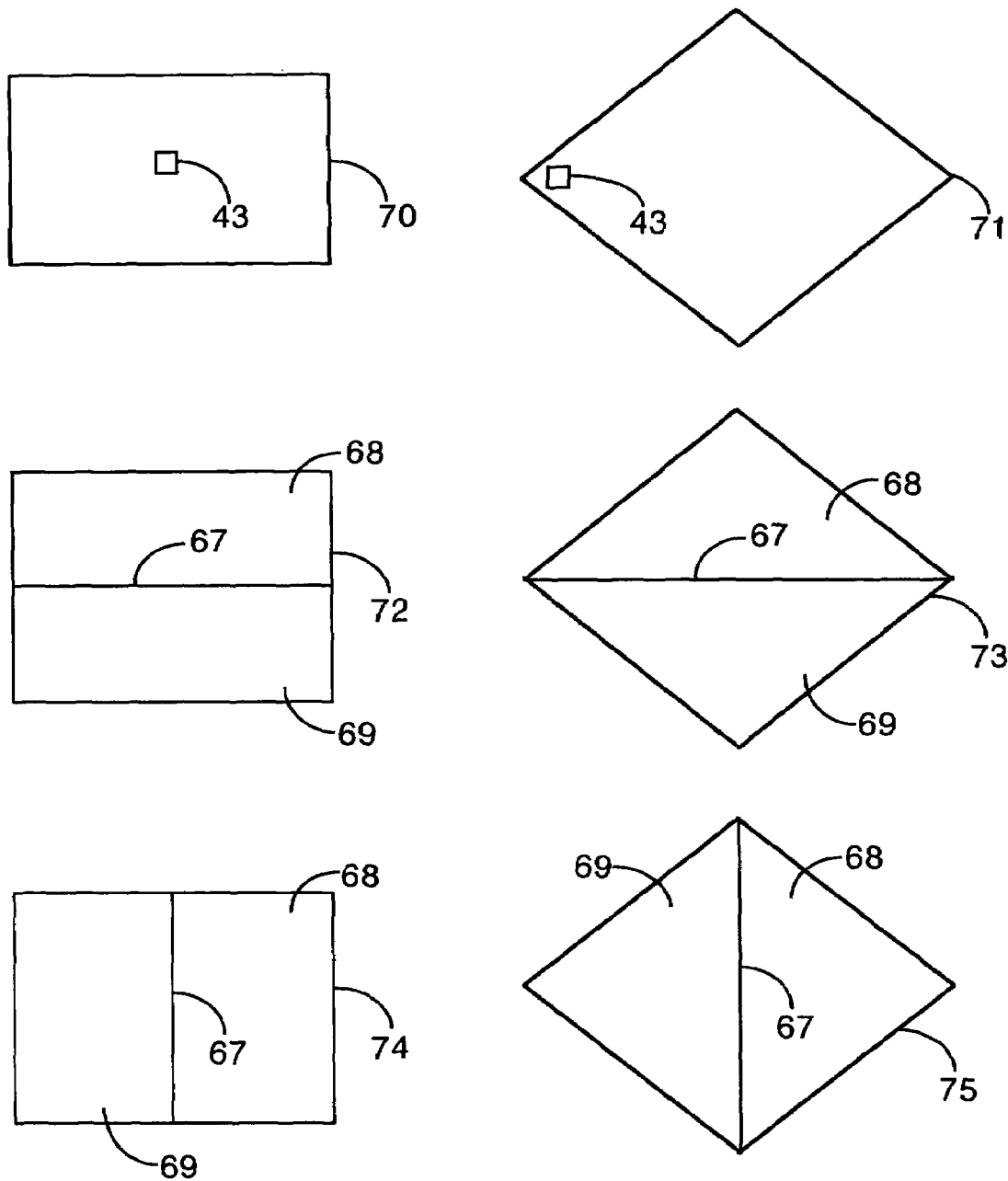
FIG. 6 depicts two example asymmetric sample areas and perpendicular bisections of these sample areas into pairs of sub areas, to be applied as homogeneous measure area extents for one basis pixel, where in addition the right sample area is not centered on the basis pixel.

In addition to varying the orientation and type of the sample area, the sample area can also be deformed. Within FIG. 6 are two examples of deformed sample areas 70, 71. Both are longer than they are high. In the preferred embodiment of the invention, all sample areas associated with a given basis pixel encompass approximately the same number of pixels. This permits comparable results to be generated. However, certain filters may require a guaranteed minimum dimension, so area sizes may differ. In such a case, care should be taken in scaling results such that they are comparable. Extremely asymmetric sample areas are useful when confronted with a very irregular border, as they may fit neatly within sharp boundary corners.

A further novel aspect is that the basis pixel need not be centered on the basis pixel. Sample area 71 illustrates this by having a basis pixel in the far left corner of the shape. Such an arrangement is advantageous in the case of basis pixels close to a segment boundary.

For each sample area, subdivide it into sub area pairs 68, 69 of approximately equal area that roughly bisect 67 the sample area. There should be at least two of these sub area pairs, where under the preferred embodiment the orientation of the bisections differs as much as possible between each pair 52. 62 and 64 show mutually perpendicular instances of the sub area pairs, as do 63 and 65, 72 and 74, and finally 73 and 75. The sub area pairs may overlap slightly. This is desirable when the sample area size is severely constrained, though such overlap will diminish the ability of the algorithm to gain a clear homogeneity measure.

The example sample areas are split perpendicularly into sub area pairs, as under the preferred embodiment of the invention this allows the homogeneity measure to be independent of any given orientation. For a two dimensional image, two perpendicular sets of pairs is the minimal arrangement for orientation independence. Selecting this minimal set of orientations reduces computation time. For more complex sample areas or for bitmaps with a higher number of dimensions it may be desirable to have a greater number of paired sample areas with additional orientations. The preferred embodiment involves two perpendicular sets of pairs of sub areas. More directions may be desirable, if for example a shape with more than four sides is chosen.

Under the preferred embodiment of the invention, for each sub area of each pair, compute a histogram measure of the values of the pixels therein, optionally excluding the basis pixel 54. Under other embodiments, other image measures may be used. Image filters may be applied to detect features and patterns. The key aspect of the invention is that for each image measure, the same image measure must be applied to all sub areas of each pair.

For each sub area pair compute the sub area difference between the resulting image measures. In the preferred embodiment of the present invention, histograms are computed for each sub area of each pair, and the results are compared using the chi-squared technique. Other methods such as mean squared difference can also be used. Other embodiments may apply different image measures and other comparison methods may be appropriate, as long as the results may be expressed in a continuous value or values that scale from a low to a high difference. Under other embodiments, the difference for multiple measures may be computed. However, for the correct generation of the homogeneity measure, similar measures must be compared with each other, and the results then may optionally be combined to produce a homogeneity measure for multiple image measures.

The next step is to optionally compute a representation value of how well represented the basis pixel is by the image measure applied to the entire sample area excluding the basis pixel, else set the representation value to be one 55. This value is useful if, as in the preferred embodiment, the sample area could occupy offsets in addition to those being centered on the basis pixel. Instances where the sample area falls mainly in a segment apart from the optimal basis pixel segment will be discarded in favor of sample areas within the optimal segment. Under the preferred embodiment, the representation value is computed by matching the content of the basis pixel with the computed histogram for the entire shape area other than the basis pixel. This may be achieved by several means, including matching basis pixel content to histogram peaks and frequencies. Matching may occur under the preferred embodiment by weighting with distance to the histogram peaks and magnitude of the peaks. This will produce a continuous value. Other embodiments may find it desirable to threshold values instead, or apply a number of different techniques. Furthermore, in embodiments where other image measures are used, other matching techniques will be preferred. Image filtering measures may require that a filter applied to the basis pixel and possibly immediate neighborhood be matched against a filter applied to the entire area excluding the basis pixel.

Then, for each sample area, compute an overall area difference, consisting of a combination of all of the sub area differences and the representation value 56. In the preferred embodiment, all the differences and the representation value are multiplied together. This will bias a good result toward one where all the constituent values are good results. Other embodiments are possible. For example, it may not be possible to compute an accurate representation value in all circumstances, so it may be conditionally applied.

The next step in the preferred embodiment is to compute the homogeneity measure as the lowest overall area difference of all of the sample areas 57. This will be stored in the scale homogeneity image. This assumes a lower value resulting from the product of the area differences and representation value implies a better homogeneity value. Other embodiments may utilize different orderings. For example, the representation value for all sample areas may be computed, and then the overall area difference need only be computed for the sample area with the lowest representation value. This takes less computational time. The preferred embodiment calculates both overall area differences and representation values for all sample areas first. The sample area with the best combination of overall area difference and representation value is chosen, as this process appears to be more accurate in picking the optimal segment border sample area.

In later steps of the present invention, the preferred embodiment utilizes results of the homogeneity measure. However, the techniques below are applicable to other image measures as a basis, as long as the measures can be formatted to provide a continuous output. These results can be placed in the homogeneity image output, and utilized in a similar fashion. The advantages of the homogeneity measure lead us to recommend it for use in the preferred embodiment.

This information will then be applied by the process in FIG. 2. to construct a scale segment image and a single scale segment list for each scale analyzed.

Combining Information from Multiple Scales

As detailed in FIG. 2, the homogeneity values and associated segments may be calculated at several scales. The next step, as outlined in FIG. 7 is to combine these values into a single representation. However, the values created above are retained, as they have additional uses in later stages of the invention.

The first step in this process is to initialize an empty complete master ordered segment list 81. This will later be filled with selected values from the ordered single scale segment lists for all the scales under consideration.

Loop through all the stages under consideration 82. For each scale, take the following action.

For each element in the ordered single scale segment list, compute a product of the combination of the pixels within the scale homogeneity image corresponding to the element, in combination with the inverse area of the segment associated with the element 83. This will be known as the homogeneity product. The characteristic of this value is that it will be small given many low homogeneity values, and low given a large segment area. Hence, the lowest values will reflect a large segment that exhibits good homogeneity. In a preferred embodiment, the inverse area calculated is normalized for all scales. For example, in a two dimensional bitmap, an area at a scale of fifty percent would be multiplied by a factor of four, so it is equivalent to an area at a scale of one hundred percent. Such equivalence allows comparison and sorting of values from all scales.

Take this element and its' homogeneity product and insert it in the complete master ordered segment list 84. The order of insertion is dependent on the homogeneity product. In the preferred embodiment, elements with lower homogeneity products will be inserted nearer the top of this list, as this speeds later operations.

In the preferred embodiment of the invention, once all scales have been computed via tasks 82, 83, 84, the next task is to create a list of segments that do not overlap. The ordering of the list should be such that the segments with the strongest homogeneity product receive precedence 85.

Accordingly, for each element of the complete master ordered segment list, in order from lowest to highest homogeneity product, conduct a test. Determine if the corresponding segment within the scale segment image does not overlap the corresponding segments within the scale segment images for any elements already inserted within the master ordered segment list. If the element passes the test, insert it in the master ordered segment list. By traversing the complete master ordered segment list in this order, the strongest segments will be selected first. It is then relatively easy to create a test excluding candidate segments. In one embodiment, the list could contain area information, such that a rapid test of all areas inserted could be achieved rapidly. This is an approximate test, but if an overlap does occur, then individual pixel overlaps can be tested.

Finally, for each element of the master ordered segment list, draw an area with a master segment image corresponding to the area associated with the element in the scale segment image 86. In one embodiment of the present invention, steps 85 and 86 may be executed simultaneously. As an element is inserted, its corresponding scale segment image representation is drawn. This may aid in speed computation of the overlap test within 85.

Computing a Master Segment Image and Master Homogeneity Image

The next steps are to optionally compute a master segment image, and optionally refine segmentation, as outlined in FIG. 8. The ordering of these steps is that of the preferred embodiment, but other orderings are possible.

In a preferred embodiment of the present invention, for the master homogeneity segment image and each of the scale segment images, calculate a corresponding expanded segment image 91. As detailed above, the initial segments are based on strongly homogeneous measures. These are unlikely to completely cover the bitmap area, and it may be desirable to attain a complete segmentation of the image.

Many segmentation algorithms exist, and the strongly homogeneous values can be utilized as a starting point for such algorithms. Area growth algorithms may use the actual segments as starting points and grow outward from them. In the preferred embodiment, the calculated homogeneity measures are applied within such area growth algorithms to aid in the process of deciding which pixels should be joined to which segments. The homogeneity measures can also aid in computing boundaries for segments, as high values will be well defined around some regions, and edge detection algorithms can be applied to identify them. Algorithms such as k-means can use the strongly homogeneous segments as a set from which to estimate k, as the number of master segments with distinct material characteristics may provide k. Finally, neural network algorithms can utilize the strongly homogeneous segments as a training set to learn how to distinguish image regions. These various methods may be applied singly, or in combination to improve the segmentation.

A further optional step is to refine the master homogeneity segment image by applying any overlapping detail with each of the scale segment images 92. If a given region in the master homogeneity segment image has originated from a coarse, lower detail scale, other scales may be applied to refine the segment extent. If a finer scale segment in one of the scale segment images significantly overlaps the coarser scale segment, it may be viewed as a member of the finer pattern of the coarse segment. As it has been computed at a finer scale, the resolution of its boundary is finer, and the boundary of the coarser scale region can be augmented with the finer extent. If the segments represented originate directly from strong homogeneity measures, boundaries should be extended but not retracted. This is due to the strong homogeneity measures being overly conservative and limited in size. Similar actions can be taken if more complex associations, such as repeating patterns of similarly characterized fine scale regions, are determined.

Finally, optionally create a master homogeneity image 93. For each pixel in the bitmap area copy the value at the equivalent of the pixel's coordinates to a master homogeneity image from the scale homogeneity image corresponding to the scale of the segment value at the pixel's coordinates within the master segment image. This will take the relevant homogeneity values from the scales associated with a given master segment, and combine them all in a single image.

Computing and Decoupling Illumination Effects

The next step is to optionally compute a master unlit bitmap and a master lighting bitmap, detailed in FIG. 9. Separating the components of surface illumination and surface texture will enable complex and convincing editing operations, including the ability to alter the illumination and surface appearance of a region. Below is a preferred embodiment of the invention, but other embodiments may apply the information derived above to improve other algorithms. For example, the strongly homogeneous regions and associated scale results together with a complete bitmap area segmentation may be applied to an automated version of the luminance/texture-decoupling algorithm detailed in Oh (2001).

In the preferred embodiment the process is iterative, converging on a solution 101.

For each element of the complete master ordered segment list with sufficient sample area compute a master lighting trend consisting of the luminance, color and saturation changes within the corresponding segment within the master segment image 102. A sufficient sample area should be at least the size of the minimum sub-area size of a sample area that could be used to derive the homogeneity for the associated segment scale. This is required, as it provides a lower bound for the scale of the texture of this segment. Smaller samples would not allow sufficient size to encompass one repeat of a patterned texture. Hence illumination could not easily be discerned from texture.

Under one embodiment, alternative simple filter strategies could be applied to very small segments, until they reach a sufficient size that the method detailed herein can be applied to them.

These trends for regions already segmented are likely to be representative, especially if the segments exhibit a strong homogeneity measure. These trends can then be expanded beyond the area of certainty into intermediate, unclassified areas 103. For each element of the complete master ordered segment list compute the expanded lighting trend beyond the boundaries of the corresponding segment within the master segment image.

Under one embodiment of the present invention, the lighting trend is calculated using a Gaussian filter applied to the bitmap area values, at the prior identified scale of the texture for that segment. By filtering artifacts around and above the size of the sample areas used in computing the homogeneity for the scale of the segment, some illumination effects may be separated from the texture component.

In another embodiment, the trend is identified by calculating histograms at intervals with a sample size encompassing the prior identified scale of the texture for that segment. The trend is derived from the shift in values or peaks between neighboring sample histograms. Lighting trends will have differing effects on different colors or luminance levels within a histogram. For example, a darkening illumination trend would be identified as a shift downward in the brightness of values or peaks within the histogram. However, if the illumination changes color, more complex behavior is present. In the preferred embodiment, where the bitmap format separates luminance and color into different channels, color shifts are easier to identify. Histogram values will converge from or to a specific hue.

Then, for each pixel, compare the fit of the detrended bitmap with that of all the complete master ordered segment list elements intersecting the pixel for the best trended fit 104. This step resolves ambiguities where trends expanded from differing segments may meet and overlap.

Once the ambiguities have been resolved, and the algorithm has converged on a solution, the illumination trends may be converted into actual illumination 105. The trends will give a filtered version of the illumination, but as they have been derived per surface, they may not give a good representation of illumination across the image. For example, given a dark surface, how can the method determine that the lighting is dark or the surface material is dark, or both? A solution within the preferred embodiment is to compare segment characteristics, and normalize the lighting component from comparable segments. For example, if a dark segment and a light segment share very similar image measures apart from the luminance component, it may be inferred that both have the same material. One is poorly illuminated, and the other is well illuminated.

In the preferred embodiment of the present invention, a further illumination normalization technique is to search for the brightest illumination component of a given material, possibly across multiple segments. The brightest lit component is likely to give an upper bound of the illumination for the material in the image. The extent of this brightest portion should be at least the size of the minimum sub-area size of a sample area that could be used to derive the homogeneity for the associated segment scale. This encompasses the material pattern size, and hence avoids spurious values if a very small part of a pattern is very bright.

At the same time, the brightest value for any particular pixel in this brightest portion is noted. Given the assumption of a fairly well exposed picture, the brightest pixels for a given material will indicate the dynamic range of light within the image. At the same time, the lighting trends at the brightest portion of a material link this dynamic range with the identified lighting trends. The lighting trends for each material can now be related to the brightest illumination.

Given a further assumption that for any given material, some portion of it will receive roughly as bright a light as the brightest portion of some other material, the illumination values between different materials can be normalized with respect to each other. This assumption may fail in, for example, areas completely in shadow. Such circumstances can be corrected using external information. In the example above, multiple exposures or user input may provide information that resolves lighting issues.

The result is an estimate of illumination values for all portions of the image, which is stored in the master illumination image. By scaling the original bitmap area values by the inverse of the master illumination image values, the unlit material texture values may be determined, and these are stored in the master unlit bitmap.

Computing Surface Shape Orientation

An optional set of steps within the present invention allows a novel means of determining the orientation of a surface represented by a segment or segments. The shape in image space is determined by segmentation algorithms outlined above. Methods detailed here give an indication as to extra dimensional shape. In a two dimensional image, an approximate three-dimensional shape may be determined. Existing methods can be applied to this problem, but make use of linear or regular repeating features to infer shape, or do so from shading information. The following method can be used in conjunction with such methods, or independently. The key differentiator is that the method can work with irregular patterns, in circumstances where other methods may fail. Hence, it is a complementary method. FIG. 10 details a flow diagram for a preferred embodiment of this portion of the invention.

Orientation may be determined for each element of the master ordered segment 111. In a preferred embodiment, the segments analyzed have been created using regions exhibiting a strong homogeneity measure. However, more extensive segments can also be used, but may give more inaccurate results.

For each master element of the master ordered segment list determine an overlap list consisting of elements within the complete master ordered segment list whose extent overlaps this master element 112. The element of the complete master ordered segment list that corresponds to the master element should be excluded so as not to test the master element with itself.

Following this, for each overlap element of the overlap list, test for content similarity and scale similarity with this master element 113. In a preferred embodiment, the test can incorporate the image measure or measures used to create the homogeneity measure. For example, characteristic histograms or other image measures of the entire segments can be compared. In addition, test that the overlapping segments were identified at similar scales. Ideally, the scales should be immediately adjacent, but orientations may be identified from non-adjacent scales.

If these tests are successful, the segments likely represent the same material that has been transformed in scale. Record the spatial and scale relationship between the tested segments 113. In a preferred embodiment, the spatial relationship can include a direction and distance between centroids or overlap borders of the two segments, together with the extent of the overlap, and the ratio of the extent as a proportion of the size of each segment, and as a ratio of the centroid distance. An optional embodiment may also include information as to the trends in the shapes of the optimal sample areas used earlier. Such trends, especially in offsets and asymmetry may indicate an asymmetric element to the surface texture orientation. This may in turn influence the resulting derived orientation information for the region.

Optionally search for additional segments overlapping the overlap elements 114. Apply the same test as applied between the master element and an overlap element above, testing all segments of the complete master ordered segment list that are not already incorporated in the overlap list. Test them against all elements of the overlap list. If the test is successful, add the new element to the overlap list, and record the spatial and scale relationship as detailed above in 113. Repeat this procedure until no new elements are added to the overlap list.

Such values can be used to infer an orientation trend. In a preferred embodiment, once all relationships for one master segment have been calculated, trends in these relationships can be established. Several example relationships are detected in the preferred embodiment, but many more exist, and these examples should not limit the scope of the analysis. A set of orientation phenomena and associated tests are detailed below.

A very simple relationship may exist where very little overlap is present, and scale changes rapidly. In such cases, it is likely that a corner or a shape discontinuity is present. For example, a fabric may be laid over a bed, and at the edge it drapes at right angles to the main surface. The degree of segment overlap may be used to determine if the corner is a sharp or a gradual corner, as greater overlap will imply a smoother transition. The degree of scale difference may be used to determine the rough angle between the surfaces adjoining the edge. Surface discontinuities may exist if adjacent segments show the same material at markedly different scales.

If a series of segments form an approximate spatial trend, such as a series of overlaps in approximately the same direction or an approximate curve, at least two possible orientations may exist. If the size of the overlap between successive segments and between successive centroid distances is approximately exponential, a perspective effect may be present. By computing the approximate ratio of change of scale and distance between centroids as a function of distance, the orientation of the surface relative to the bitmap area view direction may be approximately determined. A high ratio of change implies a surface almost normal to the bitmap area plane, while an almost linear trend implies the surface is almost parallel to the bitmap area plane. An angle to a tangent to the bitmap area plane may be calculated by applying the inverse tan function to the results of the relationship. The overall direction trend of the surface within the bitmap area plane can be determined from the overall trend of the direction between boundaries or centroids. A linear trend implies an approximately flat surface, such as a flat wall or floor. An approximate curve implies a curved surface.

Taking the algorithm above and applying it to multiple segment relationships if they exist can detect more complex relationships. Multiple segments may overlap in many directions, and considering such relationships simultaneously can resolve highly complex shapes. It may also be used to resolve ambiguities. If three or fewer linear joined segments exist, it may be difficult to determine if the relationship is a perspective one, or one due to a curved surface. More samples can resolve this problem.

In the preferred embodiment, dominant trends such as long linear and curve linear overlaps of the overlap elements and master segment are detected first. Minor trends may then be established between smaller sets of overlap elements. This is repeated, until an optimal solution is reached. A common practice is to compare the total difference between solutions from one iteration to the next, and terminate the process when the total difference falls below a threshold or where the total difference remains within a given range of values for a given number of iterations.

In the preferred embodiment, the homogeneity measure at a particular scale is determined in a fashion independent of direction. Multiple sub-area pair orientations are used. However, in an optional embodiment, additional scale and orientation information may be determined by independently recording the results of deliberately directional sub-area pair orientations. For example, if the directionless results indicate a given scale, but the directional results indicate a strong segmentation result at nearby but differing scales in the same portion of the bitmap area, this may be used to infer a direction of the surface. The surface texture is likely oriented such that a repeat scale in one direction is different from that in another direction, indicating it is not face on to the bitmap area plane. The ratios of the scales at directions approximately normal to each other can be used to derive a more exact orientation. Such information can be used to improve the orientation results.

Such methods do not take into account distortion of the bitmap area due to camera optics. Further transforms can be applied to account for such distortions, and are well documented in the literature regarding stereo matching.

Additional image measures to determine surface orientation may be applied in an optional embodiment of the present invention 115. These can be utilized alone or in conjunction with the relationships above. For example, they may be applied to resolve ambiguities. They may prove complementary, in that they give better results where regular patterns or significant numbers of edges are present, or where a strong shape from shading result can be obtained.

Overlapping segments within the master segment can also be optionally applied to determine a spatial orientation. If multiple elements are completely enclosed by the master segment, tests may be applied to determine if a regular pattern exists. The master unlit bitmap may also be used to infer shape in a manner similar to algorithms detailed in step 115.

The results from the various methods may then be combined to produce a shape estimate for the master element and associated overlap elements 116.

Finally, the results from the individual master elements are optionally integrated to refine the orientation trend for each 117. In a preferred embodiment, several methods may be applied.

One method is to use separate master elements with similar material characteristics to calibrate each other's orientations. If there are insufficient samples within one master element's associated segment to resolve an orientation, results from another master element may be used to reinforce the results.

Some of the overlap elements may have been miss-classified, and applied to multiple master elements. Alternatively, shared overlap elements may indicate a relationship between master elements. The similarity of image measure and orientation characteristics between the master elements can be used to gauge how correct these suppositions are.

Spatial continuity may also be inferred. Given three adjacent master elements and associated segments with different material characteristics, but very similar orientation trends, it may be inferred that they represent the same trend. If the middle of the two has one set of material characteristics, but the outer two are similar, it may be inferred that middle master element lies in front of or behind the others, especially if the spatial trends of the outer two can be correlated in bitmap area space.

An overall compositional structure to the bitmap area may also be inferred. If the source image represents an artificial structure, such as a room or building, certain properties can be inferred. Artificial structures often share common orientations between multiple planes. For example, furniture in a room is often aligned parallel to the floor, ceiling and walls. If multiple planes are detected with similar orientations, a point perspective may be inferred. Orientations of multiple planes apparently at right angles can be used to infer multiple point perspective. From this, a calibrated three-dimensional representation of the image can be automatically derived. See stereo matching literature for further information.

A final additional application of the resulting shapes is to improve results from earlier stages of the invention. Given a good estimate of orientation, the scales and orientations of segments are now known more accurately, and are represented as a set of continuous functions. A more accurate knowledge of scale and orientation can be used to improve the size of homogeneity measures. This can be utilized to improve segmentation and estimates of lighting effects, as the minimal size and orientation of a sample area are better known. This knowledge can also be used to further improve segmentation, as it can now resolve distinct three-dimensional borders, and also distinct objects that may have the same material, or may be composed of multiple materials.

Computing Material Characteristics.

An optional set of steps within the present invention relates the homogeneity measure segmentation outlined above to context based image retrieval. FIG. 11 details a flow diagram for a preferred embodiment of this portion of the invention. In the preferred embodiment, it is recommended that the segments exhibiting strong homogeneity measures be used. The following data will be used as a characterization of the bitmap area, or portions of it. Strongly homogeneous segments are more likely to return accurate image measures, and by underestimating extent give a conservative estimate of locations of specific phenomena. This will lead to better classification and hence improved accuracy of any processes that apply these results. Note however that other embodiments exist. For example, image measures may be derived from strongly homogeneous segments, and composition might be derived simultaneously from segments that cover a greater portion of the bitmap area.

Loop through the individual elements of the master ordered segment list 121. This is the preferred embodiment, as it assigns a single segment to each pixel element of the bitmap area. However, additional information may be obtained by analyzing the segments identified at all scales.

For each master element of the master ordered segment list calculate and store image measures that characterize the master segment 122. The image measures may use a combination of data whose creation is detailed in earlier steps. For example, it could use the original bitmap area data, or data derived from the optional master unlit bitmap. Additional characterization may be provided by the illumination data contained in the optional master lighting bitmap. The image measures may also give more accurate results if applied to information that has been rectified by use of optional orientation information. Finally, other kinds of image measures may optionally be applied to characterize the segment.

For each master element of the master ordered segment list calculate and store its spatial relationship to other master elements of the master ordered segment list 123. In the preferred embodiment, this information could include centroid distances and directions, and also the relative size of the segments. Overall compositional information could also be obtained. For example, it could be determined that a small number of master elements dominate the overall bitmap area, and their arrangement could characterize the bitmap area as a whole. The optional orientation information itself could be used to provide an additional spatial characterization of this master segment, as well as the bitmap area Once all the master elements within the master ordered segment list have been analyzed, the information can be stored in a database and associated with this bitmap area or the master element segment from which the results were derived 124. This may be repeated for many bitmap areas. Analysis results of a bitmap area can then be used to match and retrieve lists of master element segments or bitmap areas from the database 125.

What is claimed is:

1. A method for numerically characterizing the homogeneity of a portion of a bitmap area in the neighborhood of a basis pixel, comprising the following steps of:
   a) computing one or more sample areas that contain said basis pixel;
   b) deriving at least two sub area pairs that each bisect each said sample area into two sub areas of approximately equal extent by way of a bisection boundary that differs in orientation between each of said at least two sub area pairs;
   c) calculating the one or more image measures for each said sub area;
   d) calculating a sub area difference as the result of a difference measure applied to the pairs of corresponding said one or more image measures calculated from said sub areas of said sub area pair; and
   e) determining the homogeneity value for each said sample area as the combination of said sub area differences.

2. The method of claim 1, further comprising the steps of:
   f) for each said sample area computing a representation value equal to a measure of how well represented said basis pixel is by the results of said one or more image measures applied to the entire sample area excluding said basis pixel; and
   g) scaling the homogeneity value by said representation value.

3. The method of claim 1, wherein for each sample area the orientation of the sub area pairs differ as much as possible between each said sub area pair.

4. The method of claim 1, wherein the step of computing the extent of said sample area that contains said basis pixel is performed by selecting an optimal candidate sample area through the variation of shape, orientation, and offset of said sample area relative to said basis pixel such that said one or more image measures as applied to said candidate sample area excluding said basis pixel best matches the content of said basis pixel.

5. The method of claim 2, wherein the step of computing the extent of said sample area that contains said basis pixel is performed by selecting an optimal candidate sample area through the variation of shape, orientation, and offset of said sample area relative to said basis pixel such that said one or more image measures as applied to said candidate sample area excluding said basis pixel best matches the content of said basis pixel.

6. The method of claim 3, wherein the step of computing the extent of said sample area that contains said basis pixel is performed by selecting an optimal candidate sample area through the variation of shape, orientation, and offset of said sample area relative to said basis pixel such that said one or more image measures as applied to said candidate sample area excluding said basis pixel best matches the content of said basis pixel.

7. A method for numerically characterizing the homogeneity of a portion of a bitmap area in the neighborhood of a basis pixel, comprising the following steps of:
   a) computing one or more sample areas that contain said basis pixel;
   b) computing a representation value for each said sample area;
   c) selecting one or more representative sample areas using said representation value for each said sample area;
   d) deriving at least two sub area pairs that each bisect each said representative sample area into two sub areas of approximately equal extent by way of a bisection boundary that differs in orientation between each of said at least two sub area pairs;
   e) calculating the one or more image measures for each said sub area;
   f) calculating a sub area difference as equal to a difference measure applied to the pairs of corresponding said one or more image measures derived from said sub areas of said sub area pair;
   g) calculating the overall area difference for each said sample area as the combination of said sub area differences corresponding to all said sub area pairs associated with said sample area; and
   h) computing a homogeneity value for each said representative sample area using said overall area difference.

8. The method of claim 7, wherein the step of computing said representation value for each said representative sample area includes the step of:
   b1) computing said representation value equal to a measure of how well represented said basis pixel is by the results of said one or more image measures applied to said sample area excluding said basis pixel.

9. The method of claim 7, wherein the step of computing the extent of a plurality of sample areas that contain said basis pixel is performed by varying shape, orientation, and offset of said sample areas relative to said basis pixel to produce a variety of said sample areas.

10. The method of claim 8, wherein the step of computing the extent of one or more said sample areas that contain said basis pixel is performed by varying shape, orientation, and offset of said sample areas relative to said basis pixel to produce a variety of said sample areas.

11. The method of claim 8, further comprising the step of:
   i) selecting an optimal homogeneity value using the homogeneity values calculated in prior steps.

12. The method of claim 9, wherein for each said sample area the orientation of said sub area pairs differ as much as possible between each said sub area pair.

13. The method of claim 10, further comprising the step of:
   i) selecting an optimal homogeneity value using the homogeneity values calculated in prior steps.

14. A method for numerically characterizing the homogeneity of a sample area of a bitmap area, comprising the following steps of:
   a) deriving the at least two sub area pairs that each bisect said sample area into two sub areas of approximately equal extent by way of a bisection boundary that differs in orientation between each of said at least two sub area pairs;
   b) calculating the one or more image measures for each said sub area;
   c) calculating a sub area difference for each said sub area pair as equal to a difference measure applied to the pairs of corresponding said one or more image measures derived from the two said sub areas of said sub area pair; and
   d) determining the homogeneity value as the combination of said sub area differences.

15. The method of claim 14, wherein steps a through d are repeated for each of said one or more image measures, further comprising the step of:
   e) computing the optimal homogeneity measure as the optimal homogeneity value for a given subset of said one or more image measures.

16. A method for partially segmenting a bitmap area, comprising the following steps of:
   a) calculating the one or more scale homogeneity images each containing an array of homogeneity measures at the associated scale;
   b) for each of said one or more scale homogeneity images computing the homogeneous regions consisting of the contiguous regions of strong said homogeneity measures within said scale homogeneity image and storing each said contiguous region extent in a scale segment image and associated information in an element of a single scale segment list; and
   c) computing a master ordered segment list from the content of all said single scale segment lists and said scale segment images where priority is given to said single scale segment list elements exhibiting a combination of larger area size and good average homogeneity measure and such that said contiguous region extent of one said master ordered segment list element is not overlapped by said contiguous region extent of any other said master ordered segment list element.

17. A method for partially segmenting a bitmap area, comprising the following steps of:
   a) calculating the one or more scale homogeneity images each containing an array of homogeneity measures at the associated scale;
   b) for each of said one or more scale homogeneity images computing the strongly homogeneous regions and storing the region extent in a scale segment image and associated information in an element of a single scale segment list; and
   c) computing a master ordered segment list from the content of all said single scale segment lists where priority is given to said single scale segment list elements exhibiting a combination of larger area size and strong said homogeneity measure and such that said region extent of one said master ordered segment list element is not overlapped by said region extent of any other said master ordered segment list element.

18. The method of claim 16, further comprising the step of:
d) utilizing said bitmap area and scale associated with one or more said master ordered segment list elements as a source of information for further segmentation algorithms.

19. The method of claim 17, further comprising the step of:
d) utilizing said bitmap area and scale associated with one or more said master ordered segment list elements as a source of information for further segmentation algorithms.

20. The method of claim 16, further comprising the step of:
d) for said master ordered segment list element computing an overlap segment list consisting of said single scale segment list elements that overlap said master ordered segment list element and said single scale segment list elements that both overlap existing said overlap segment list elements and exhibit said one or more image measures consistent with the said master ordered segment list element; and
e) utilizing said overlap segment list as a means of identifying scale and orientation information within the image content represented by the area associated with said master ordered segment list element and said overlap segment list elements.

21. The method of claim 17, further comprising the step of:
d) for said master ordered segment list element computing an overlap segment list consisting of said single scale segment list elements that overlap said master ordered segment list element and said single scale segment list elements that both overlap existing said overlap segment list elements and exhibit said one or more image measures consistent with the said master ordered segment list element; and
e) utilizing said overlap segment list as a means of identifying scale and orientation information within the image content represented by the area associated with said master ordered segment list element and said overlap segment list elements.

22. The method of claim 16, further comprising the step of:
d) for said master ordered segment list element computing an overlap segment list consisting of said single scale segment list elements that overlap said master ordered segment list element; and
e) refining the boundary of said master ordered segment list element on the basis of the boundaries of said overlap segment list elements.

23. The method of claim 17, further comprising the step of:
d) for said master ordered segment list element computing an overlap segment list consisting of said single scale segment list elements that overlap said master ordered segment list element; and
e) refining the boundary of said master ordered segment list element on the basis of the boundaries of said overlap segment list elements.

24. The method of claim 16, further comprising the step of:
d) utilizing said bitmap area content and scale associated with one or more said master ordered segment list elements as a source of information for calculating the illumination and texture information present within said bitmap area content.

25. The method of claim 17, further comprising the step of:
d) utilizing said bitmap area content and scale associated with one or more said master ordered segment list elements as a source of information for calculating the illumination and texture information present within said bitmap area content.

* * * * *